(12) United States Patent
Fisher

(10) Patent No.: US 12,612,976 B2
(45) Date of Patent: Apr. 28, 2026

(54) VALVE ASSEMBLY FOR DISPENSING FOODSTUFF AND DISPENSER APPARATUS AND LID COMPRISING THE SAME

(71) Applicant: Franke Kindred Canada Limited, Midland (CA)

(72) Inventor: Adrian Fisher, Vancouver (CA)

(73) Assignee: Franke Kindred Canada Limited, Midland (CA)

( * ) Notice: Subject to any disclaimer, the term of this patent is extended or adjusted under 35 U.S.C. 154(b) by 29 days.

(21) Appl. No.: 18/645,059

(22) Filed: Apr. 24, 2024

(65) Prior Publication Data

US 2024/0426385 A1      Dec. 26, 2024

Related U.S. Application Data

(60) Provisional application No. 63/523,330, filed on Jun. 26, 2023.

(51) Int. Cl.
| | |
|---|---|
| *B65D 47/20* | (2006.01) |
| *F16K 15/14* | (2006.01) |
| *F16K 25/00* | (2006.01) |

(52) U.S. Cl.
CPC ........ *F16K 15/145* (2013.01); *B65D 47/2031* (2013.01); *B65D 47/2081* (2013.01);
(Continued)

(58) Field of Classification Search
CPC .. F16K 15/145; F16K 15/147; F16K 15/1472; B65D 47/2018; B65D 47/2031; B65D 47/205; B65D 47/2081
See application file for complete search history.

(56) References Cited

U.S. PATENT DOCUMENTS

| | | | |
|---|---|---|---|
| 512,930 | A | 1/1894 | Witte |
| 958,994 | A | 5/1910 | Davis |
| | | (Continued) | |

FOREIGN PATENT DOCUMENTS

| | | |
|---|---|---|
| CA | 2930097 C | 3/2023 |
| DE | 2739893 A1 | 7/1978 |
| | (Continued) | |

OTHER PUBLICATIONS

European Search Report issued on European Patent Application No. EP 24172981.3, search completed Oct. 4, 2024.
(Continued)

*Primary Examiner* — Kevin F Murphy
(74) *Attorney, Agent, or Firm* — Nicholas Garner; Oyen Wiggs Green & Mutala LLP

(57) ABSTRACT

There is provided a valve assembly for dispensing foodstuff. The valve assembly includes an inner valve member. The inner valve member includes a radially outwardly-extending flange with one or more circumferentially spaced-apart apertures extending therethrough. The inner valve member includes an elongate protrusion coupled to and extending axially outwards from the flange thereof. The one or more apertures are adjacent to and extend about an exterior of the elongate protrusion. The valve assembly includes an outer valve member that is more resilient than the inner valve member. The outer valve member includes a radially outwardly-extending flange shaped to couple with the flange of the inner valve member. The outer valve member includes a tubular portion which is cylindrical in outer shape and which extends about the elongate protrusion. The outer valve member includes a tapered sleeve that extends and tapers from the flange to the tubular portion.

20 Claims, 11 Drawing Sheets

(52) U.S. Cl.

CPC ........ *F16K 15/147* (2013.01); *F16K 15/1472* (2021.08); *F16K 25/00* (2013.01)

(56) References Cited

U.S. PATENT DOCUMENTS

| | | | |
|---|---|---|---|
| 1,188,840 | A | 6/1916 | Schneider |
| 1,397,510 | A | 11/1921 | Grassi |
| 1,896,750 | A | 2/1933 | Maas |
| 1,996,628 | A | 4/1935 | Frederick |
| 2,104,990 | A | 1/1938 | Hoefler |
| 2,138,045 | A | 11/1938 | Seeberger |
| 2,233,587 | A | 3/1941 | Samuel |
| 2,376,052 | A | 5/1945 | Hacmac |
| 2,443,022 | A | 6/1948 | Martin |
| 2,517,796 | A | 8/1950 | Mathis |
| 2,634,692 | A | 4/1953 | Sherbondy |
| 2,695,708 | A | 11/1954 | Lucian |
| 2,715,980 | A | 8/1955 | Frick |
| 2,892,286 | A | 6/1959 | Martin |
| 3,161,325 | A | 12/1964 | Hinkel et al. |
| 3,174,653 | A | 3/1965 | Mceachran |
| 3,321,114 | A | 5/1967 | Croyle |
| 3,323,682 | A | 6/1967 | Creighton, Jr. et al. |
| 3,390,814 | A | 7/1968 | Creighton, Jr. et al. |
| 3,774,816 | A | 11/1973 | Bratton |
| 3,933,273 | A | 1/1976 | Cox |
| 3,981,419 | A * | 9/1976 | Nilson ............... B65D 47/2081 |
| | | | 222/494 |
| 4,318,499 | A | 3/1982 | Hamilton |
| 4,323,176 | A | 4/1982 | Sartain |
| 4,330,070 | A | 5/1982 | Doubleday |
| 4,373,646 | A | 2/1983 | MacEwen |
| 4,421,255 | A | 12/1983 | Czech |
| 4,469,250 | A | 9/1984 | Evezich |
| 4,474,314 | A | 10/1984 | Roggenburg, Jr. |
| 4,566,610 | A | 1/1986 | Herb |
| 4,699,300 | A * | 10/1987 | Blake ................ B65D 47/2081 |
| | | | 222/481 |
| 4,739,906 | A | 4/1988 | LoTurco |
| 4,749,106 | A | 6/1988 | Von Schuckmann et al. |
| 4,753,373 | A | 6/1988 | Seager |
| 4,805,810 | A | 2/1989 | Czetwertynski |
| 4,960,024 | A | 10/1990 | Holcomb |
| 4,966,537 | A | 10/1990 | Bowles et al. |
| 5,108,007 | A | 4/1992 | Smith et al. |
| RE34,243 | E | 5/1993 | Gerber |
| 5,226,568 | A * | 7/1993 | Newton ............. B65D 47/2081 |
| | | | 222/212 |
| 5,251,783 | A | 10/1993 | Gringer |
| 5,297,702 | A | 3/1994 | Crosby et al. |
| 5,323,931 | A | 6/1994 | Robards, Jr. et al. |
| 5,323,934 | A | 6/1994 | Isert |
| 5,375,740 | A | 12/1994 | Umetsu et al. |
| 5,392,956 | A | 2/1995 | Keller |
| 5,429,273 | A | 7/1995 | King et al. |
| 5,443,181 | A | 8/1995 | Popp et al. |
| 5,454,396 | A * | 10/1995 | Hochstrasser ........ F16K 15/145 |
| | | | 137/218 |
| 5,634,572 | A | 6/1997 | Lane, Jr. et al. |
| 5,850,923 | A | 12/1998 | DeCoster et al. |
| 5,971,230 | A | 10/1999 | Tanaka |
| 6,026,985 | A | 2/2000 | Elliott, Sr. |
| 6,230,940 | B1 | 5/2001 | Manning et al. |
| D448,257 | S | 9/2001 | Stewart et al. |
| D462,584 | S | 9/2002 | So |
| 6,478,190 | B2 | 11/2002 | Kuge et al. |
| 6,598,764 | B1 | 7/2003 | Stern |
| 6,708,853 | B1 | 3/2004 | Melling |
| 6,824,018 | B1 | 11/2004 | Eaddy et al. |
| 6,951,295 | B1 | 10/2005 | Gaus et al. |
| 7,037,094 | B1 | 5/2006 | Lee |
| 7,367,519 | B2 | 5/2008 | de Groote et al. |
| 7,467,731 | B2 | 12/2008 | Shraiber |
| 7,506,783 | B2 | 3/2009 | Brennan et al. |
| 7,703,447 | B2 | 4/2010 | Caveza |

| | | | |
|---|---|---|---|
| D616,259 | S | 5/2010 | Harris et al. |
| 7,775,399 | B2 | 8/2010 | Wood |
| 7,850,045 | B2 | 12/2010 | So et al. |
| 7,959,038 | B2 | 6/2011 | de Oliveira et al. |
| 8,172,109 | B2 | 5/2012 | Cadden |
| 8,220,668 | B2 | 7/2012 | Cadden et al. |
| 8,235,255 | B2 | 8/2012 | Springhorn et al. |
| 8,281,956 | B2 | 10/2012 | Cadden |
| 8,376,189 | B2 * | 2/2013 | Py ......................... F16K 15/142 |
| | | | 141/90 |
| 8,418,890 | B2 | 4/2013 | Lakic |
| 8,424,727 | B2 | 4/2013 | Herman et al. |
| 8,511,520 | B2 | 8/2013 | van Wijk et al. |
| 8,561,854 | B2 | 10/2013 | Tirone et al. |
| D698,616 | S | 2/2014 | van Wijk et al. |
| 8,870,035 | B2 | 10/2014 | Jalali et al. |
| 8,960,502 | B2 | 2/2015 | Stehli, Jr. et al. |
| 9,067,711 | B2 | 6/2015 | Melia |
| 9,114,415 | B2 | 8/2015 | Williams et al. |
| 9,314,813 | B2 | 4/2016 | Pritchard |
| 9,694,944 | B2 | 7/2017 | Long et al. |
| 9,937,519 | B2 | 4/2018 | Chen et al. |
| 9,975,676 | B2 | 5/2018 | Chen |
| 10,131,473 | B2 | 11/2018 | Sterling et al. |
| 11,040,181 | B2 | 6/2021 | Skakoon et al. |
| 2002/0162859 | A1 | 11/2002 | Summons et al. |
| 2002/0179645 | A1 | 12/2002 | So |
| 2002/0190079 | A1 | 12/2002 | Hamamoto |
| 2006/0065132 | A1 | 3/2006 | Jongen et al. |
| 2006/0144854 | A1 | 7/2006 | Clemens et al. |
| 2006/0175348 | A1 | 8/2006 | Wood |
| 2006/0246187 | A1 | 11/2006 | Egolf et al. |
| 2007/0255228 | A1 | 11/2007 | Secondo |
| 2009/0065527 | A1 | 3/2009 | Buck |
| 2009/0159613 | A1 | 6/2009 | Rusch |
| 2009/0206104 | A1 | 8/2009 | Loranger |
| 2009/0302055 | A1 | 12/2009 | Cadden et al. |
| 2010/0089953 | A1 | 4/2010 | Lakic |
| 2010/0264172 | A1 | 10/2010 | Nossbaum et al. |
| 2011/0006076 | A1 | 1/2011 | Williams |
| 2012/0217270 | A1 | 8/2012 | Robbins |
| 2012/0228334 | A1 | 9/2012 | van Wijk et al. |
| 2013/0153600 | A1 | 6/2013 | Sanfilippo et al. |
| 2014/0138406 | A1 | 5/2014 | Sanfilippo et al. |
| 2015/0114987 | A1 | 4/2015 | Pritchard |
| 2016/0244222 | A1 | 8/2016 | Sterling et al. |

FOREIGN PATENT DOCUMENTS

| | | | |
|---|---|---|---|
| EP | 0434326 | A1 | 6/1991 |
| EP | 1512510 | A2 | 3/2005 |
| GB | 326683 | A | 3/1930 |
| GB | 445391 | A | 4/1936 |
| GB | 659403 | A | 10/1951 |
| GB | 696310 | A | 8/1953 |
| GB | 2106480 | A | 4/1983 |
| JP | 2002002755 | A | 1/2002 |
| JP | 2004291968 | A | 10/2004 |
| JP | 2006232327 | A | 9/2006 |
| JP | 2009545497 | A | 12/2009 |
| JP | 4916667 | B2 | 4/2012 |
| JP | 5331689 | B2 | 10/2013 |
| JP | 6073582 | B2 | 2/2017 |
| WO | 2006077574 | A2 | 7/2006 |
| WO | 2007056131 | A2 | 5/2007 |

OTHER PUBLICATIONS

Cuisipro Batter Dispenser, http://cooking.cuisipro.com/en/Batter-Dispenser-plu74-712000.html; as obtained from the WayBackMachine with an archived date of Nov. 4, 2014: https://web.archive.org/web/20141104103007/http://cooking.cuisipro.com/en/Batter-Dispenser-plu74-712000.html.

FIFO Portion Pal, https://www.fifobottle.com/portion-pal-main/, as obtained from the WayBackMachine with an archived date of Mar. 30, 2023; https://web.archive.org/web/20230330185504/https://www.fifobottle.com/portion-pal-main/.

(56) References Cited

OTHER PUBLICATIONS

FMP 24 oz Fifo Portion Control Bottle—CooksDirect.com, as obtained from the WayBackMachine with an archived date of Mar. 18, 2014: https://web.archive.org/web/20140318154402/http://www.cooksdirect.com/product/fmp-280-1821/squeeze-bottles.

Norpro 4-Cup Batter Dispenser: Amazon.com: Kitchen & Dining, [online], as obtained from the WayBackMachine with an archived date of Feb. 7, 2016: https://web.archive.org/web/20160207231142/https://www.amazon.com/Norpro-1013-4-Cup-Batter-Dispenser/dp/B005XPES9Q.

* cited by examiner

FIG. 4

VALVE ASSEMBLY FOR DISPENSING FOODSTUFF AND DISPENSER APPARATUS AND LID COMPRISING THE SAME

BACKGROUND OF THE INVENTION

Field of the Invention

There is provided a valve assembly. In particular, there is provided a valve assembly for dispensing foodstuff, as well as a dispenser apparatus and a dispenser lid comprising the same.

Description of the Related Art

United Kingdom Patent No. 445391 to Ellyson discloses a collapsible tube or the like. The tube has an extrusion opening in the tube head covered by a resilient tire valve. A forwardly open shell, integral with or adapted to be secured to the tube proper, surrounds the tube head. The upper part of the shell is inwardly directed or bent over to meet flush with the tube head and to enclose the valve thereon.

European Patent Application Publication No. 1512510 to Gerber discloses a process for making a cartridge for dispensing flowable material such as liquids, solutions, dispersions, suspensions, gels and pastes, while maintaining the sterility and integrity of the flowable material. The process includes molding a housing of a rigid and inert material. The housing has an outlet port. Further, a delivery block is molded with at least two asymmetrical components to give a parting line on the delivery block and an internal channel connecting an inlet and outlets. The next step in the process is the molding of an elastomeric sheath. The sheath has two asymmetrical components to give a parting line on the sheath. The sheath is placed over the delivery block to envelope the delivery block and to cover the outlet of the delivery block. The sheath covered delivery block is placed in the housing so that in use an outlet valve of the sheath directs the flowable material through the housing outlet port. The sheath and the delivery block have contact surfaces in contact with each other but the parting lines of both the delivery block and the sheath are on non-contact surfaces so that the parting lines are away from any smooth and sealing surfaces to ensure that in use the flowable material is not contaminated.

United Kingdom Patent No. 2106480 to Ichiro discloses a medical liquid container. The container includes a container body for containing medical liquids. The container body is made of synthetic resin or the like. The container includes a valve having an inner cap attached to an opening of the container body. The container has a hollow cap-like portion provided with through-holes in the side wall thereof. A tube of resilient material is sealingly fitted onto the hollow cap-like portion to normally close the through-holes. An outer cap is arranged outside tube and has a shoulder portion for fixedly locating tube onto the base of the inner cap. The outer cap is provided with a through-hole through which medical liquid is released. The tube has a lift off portion in response to squeezing of container body. Initially the outer cap is sealed by a break-off portion.

U.S. Pat. No. 10,131,473 to Sterling et al. discloses a dispensing system that includes a bottle, a valve cap, and a dosing cap. The bottle includes a side wall having at least a portion that is flexible. The valve cap regulates the dispensing of a flowable product from bottle into the dosing cap. In particular, flowable product may be dispensed from the bottle into the dosing cap when the dispensing system is in an inverted position and while the dosing cap is attached to valve cap. The valve cap and the dosing cap may support the dispensing system in the inverted position.

Japanese Patent Reference No. 5331689 to Fontana discloses a bottle for containing liquid. The bottle is made deformable material. A liquid container mouth portion is provided for passing liquid therethrough. There is provided a flexible inner chamber arranged in proximity of the mouth portion of the liquid container. This valve comprises a material capable of elastic deformation. It includes a cap having a dispensing port for dispensing the liquid. By squeezing the liquid container, the liquid is pushed up toward the mouth, the valve is compressed, and the liquid flows between the valve and the cap and flows out through the distribution port. The bottle includes a constraining ring that can limit the deformation of the valve by being configured to surround at least a portion of the valve positioned between the cap valve from the outside. The valve further includes a support and closure means for closing the inner chamber. The restraining ring is integrally coupled to the supporting and closing means.

German Patent Reference No. 2739893 to Laauwe discloses a squeeze bottle made of elastically deformable material. The bottle includes a mouth having a dispensing valve. The valve has an outer part and an inner part which are arranged one above the other and an intermediate space. The inner part has at least one passage connecting the interior of the bottle with the intermediate space. The inner part is being provided with an outwardly directed extension which has a second passage, through which the intermediate space can be connected to the external environment. The outer part has a flexible membrane surrounding the extension which is provided with a cuff which sits slidably on the projection and closes the second passage in its normal position. When the membrane is deformed outwards, the membrane assumes a position in which the second passage is open. The membrane consists of elastically deformable material and one of the parts is provided with an inwardly opening one-way valve for the passage of air.

The above-described prior art may suffer a number of disadvantages.

BRIEF SUMMARY OF INVENTION

There is provided, and it is an object to provide, an improved valve assembly for dispensing foodstuff disclosed herein, together with an improved dispenser apparatus and lid comprising the same.

There is accordingly provided a valve assembly for dispensing foodstuff according to one aspect. The valve assembly includes a protrusion with a laterally-extending end member coupled thereto and with one or more apertures extending through or adjacent the end member thereof. The valve assembly includes a tubular resilient member extending about and being configured to move both axially and radially outwards relative to the protrusion to selectively enable foodstuff to pass therethrough.

There is also provided a valve assembly for dispensing foodstuff according to another aspect. The valve assembly includes an inner valve member. The inner valve member includes a radially outwardly-extending flange with one or more circumferentially spaced-apart apertures extending therethrough. The inner valve member includes an elongate protrusion coupled to and extending axially outwards from the flange thereof. The one or more apertures are adjacent to and extend about an exterior of the elongate protrusion. The valve assembly includes an outer valve member that is more resilient than the inner valve member. The outer valve member includes a radially outwardly-extending flange shaped to couple with the flange of the inner valve member. The outer valve member includes a tubular portion that is cylindrical in outer shape and which extends about the elongate protrusion. The outer valve member includes a tapered sleeve which extends and tapers from the flange to the tubular portion.

There is additionally provided a valve assembly for dispensing foodstuff according to a further aspect. The valve assembly includes an elongate conduit having a closed end and one or more radially-extending apertures extending therethrough. The valve assembly includes a tubular resilient member extending about the conduit. The valve assembly includes one or more ledges coupled to and extending radially outwards from the conduit.

There is accordingly provided a valve assembly for dispensing foodstuff according to an additional aspect. The valve assembly includes an elongate conduit with a closed end and one or more radially-extending apertures extending therethrough. The valve assembly includes a tubular resilient member. The tubular resilient member is shaped to extend about, parallel to and axially outwards from the outer surface of the conduit.

There is also provided a valve assembly for dispensing foodstuff according to another aspect. The valve assembly includes an elongate conduit. The conduit has a closed end, an outer surface and one or more radially-extending apertures extending therethrough. The valve assembly includes a tubular resilient member shaped to extend about the conduit. The valve assembly includes one or more stops extending radially from one of the conduit and the tubular resilient member. The one or more stops are shaped to inhibit movement of the tubular resilient member relative to the conduit both axially and circumferentially.

There is further provided a valve assembly for dispensing foodstuff according an additional aspect. The valve assembly includes an elongate conduit. The conduit has a closed end and one or more radially-extending apertures extending therethrough. The valve assembly includes a tubular resilient member shaped to extend about the conduit. The valve assembly includes one or more stops extending between the conduit and the tubular resilient member. The one or more stops are wedge-shaped at least in part.

There is additionally provided a valve assembly for dispensing foodstuff according to yet another aspect. The valve assembly includes an elongate conduit. The conduit has a closed end and one or more radially-extending apertures extending therethrough. The valve assembly includes a tubular resilient member extending about the conduit. The valve assembly includes one or more ledges coupled to and extending radially outwards from the conduit. The tubular resilient member is suspended from the one or more ledges.

There is also provided a valve assembly for dispensing foodstuff according to yet another aspect. The valve assembly includes a first tube in communication with the foodstuff. The first tube is rigid, has a closed distal end and has one or more radially-extending apertures extending therethrough. The valve assembly includes a second tube that is resilient. The second tube extends about and axially outwards from the first tube.

There is further provided a valve assembly for dispensing foodstuff according yet an additional aspect. The valve assembly includes an elongate conduit. The conduit has a closed end and one or more axially-extending apertures extending therethrough. The valve assembly includes a protrusion coupled to and extending axially outwards from the conduit. The valve assembly includes a tubular resilient member extending about the conduit. The tubular resilient member is shaped to inhibit foodstuff from exiting from the one or more apertures. The tubular resilient member includes a distal end portion which extends about the protrusion. The distal end portion of the tubular resilient member has a reduced wall thickness.

There is additionally provided a valve assembly for dispensing foodstuff according to another aspect. The valve assembly includes an elongate conduit. The conduit has a closed end and one or more axially-extending apertures extending therethrough. The valve assembly includes a protrusion coupled to and extending axially outwards from the conduit. The valve assembly includes a tubular resilient member extending about the conduit. The tubular resilient member is shaped to inhibit foodstuff from exiting from the one or more apertures. The tubular resilient member includes a distal end portion which extends about the protrusion. The distal end portion of the tubular resilient member is axially aligned with the one or more apertures.

There is also provided a valve assembly for dispensing foodstuff according to a further aspect. The valve assembly includes an end elongate conduit. The conduit has a closed end and one or more axially-extending apertures extending therethrough. The valve assembly includes a protrusion coupled to and extending axially outwards from the conduit. The valve assembly includes a tubular resilient member extending about the conduit. The tubular resilient member is shaped to inhibit foodstuff from exiting from the one or more apertures. The tubular resilient member is corrugated at least in part.

There is further provided a valve assembly for dispensing foodstuff according to an additional aspect. The valve assembly includes an elongate conduit. The conduit has a closed end and one or more axially-extending apertures extending therethrough. The valve assembly includes a protrusion coupled to and extending axially outwards from the conduit. The valve assembly includes a tubular resilient member extending about the conduit. The tubular resilient member is shaped to inhibit foodstuff from exiting from the one or more apertures. The tubular resilient member includes a plurality of annular folds.

There is additionally provided a valve assembly for dispensing foodstuff according to yet another aspect. The valve assembly includes a valve. The valve includes one or more circumferentially spaced-apart flanges. The valve includes a first tubular portion coupled to and extending axially outwards from the one or more flanges. The valve includes a second tubular portion coupled to and extending axially outwards and radially inwards from the first tubular portion. The valve includes a third tubular portion coupled to and extending axially outwards and radially inwards from the third tubular portion. The valve includes a fourth tubular portion coupled to and extending axially outwards from the third tubular portion.

There is also provided a valve assembly for dispensing foodstuff according to a further aspect. The valve assembly includes a valve. The valve includes a radially-outwardly extending first flange. The valve includes a first tubular portion coupled to and extending axially outwards from the first flange. The first tubular portion has one or more folds at least in a non-actuated state of the valve assembly. The valve includes a second flange coupled to and extending radially inwards from the first tubular portion. The valve includes a third tubular portion coupled to and extending axially outwards and radially inwards from the second flange. The valve includes a fourth tubular portion coupled to and extending axially outwards from the third tubular portion.

There is further provided a valve assembly for dispensing foodstuff according to another aspect. The valve assembly includes a valve. The valve includes a radially-outwardly extending first flange. The valve includes a first tubular portion coupled to and extending axially outwards from the first flange. The valve includes a second flange coupled to and extending radially inwards from the first tubular portion. The second flange has one or more folds at least in a non-actuated state of the valve assembly. The valve includes a third tubular portion coupled to and extending axially outwards and radially inwards from the second flange. The valve includes a fourth tubular portion coupled to and extending axially outwards from the third tubular portion.

There is also provided a valve assembly for dispensing foodstuff according to yet a further aspect. The valve assembly includes an elongate conduit. The conduit has a closed end and one or more axially-extending apertures extending therethrough. The valve assembly includes a protrusion coupled to and extending axially outwards from the conduit. The valve assembly includes a tubular resilient member extending about the conduit. The valve assembly is shaped to inhibit foodstuff from exiting from the one or more apertures. The tubular resilient member has one or more recessed regions aligned with the one or more apertures.

There is additionally provided a valve assembly for dispensing foodstuff according to a further aspect. The valve assembly includes an elongate conduit having a closed end, an outer surface and one or more radially-extending apertures extending therethrough. The valve assembly includes a tubular resilient member shaped to extend about and parallel to the outer surface of the conduit. The extent to which the resilient member aligns with or extends axially outwards from the elongate conduit is a function of the viscosity of the foodstuff.

There is further provided a valve assembly for dispensing foodstuff according to another aspect. The valve assembly includes an elongate conduit having a closed end, an outer surface and one or more radially-extending apertures extending therethrough. The valve assembly includes a tubular resilient member shaped to extend about and parallel to the outer surface of the conduit. The resilient member is configured such that a distal end thereof aligns near or adjacent the closed end of the elongate conduit for less viscous foodstuff and is spaced axially outwards from the closed end of the elongate conduit for more viscous foodstuff.

There is additionally provided a dispenser apparatus according to one aspect. The dispenser apparatus includes any one of the above valve assemblies.

There is further provided a dispenser apparatus according to another aspect. The dispenser apparatus includes an enclosure shaped to receive foodstuff therewithin. The dispenser apparatus includes any one of the above valve assemblies. The dispenser apparatus includes one or more base members extending about the valve assembly. Each base member has a proximal end coupled to the enclosure and a distal end axially spaced from the proximal end thereof. Each base member is shaped to abut a respective one of the one or more flanges of the valve assembly.

There is also provided a dispenser lid according to one aspect. The dispenser lid includes any one of the above valve assemblies.

There is further provided a dispenser lid according to another aspect. The dispenser lid includes any one of the above valve assemblies together with one or more of the above base members.

There is also provided a method of configuring a valve assembly for dispensing foodstuff. The method includes providing an elongate conduit having a closed end, an outer surface and one or more radially-extending apertures extending therethrough. The method includes providing a tubular resilient member shaped to extend about and parallel to the outer surface of the conduit. The method includes configuring the extent to which a distal end of the resilient member aligns with or space axially outwards from the closed end of the elongate conduit based on a viscosity of the foodstuff.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

FIG. 4 is a bottom, front perspective view of a dispenser apparatus according to another aspect, the dispenser apparatus including a dispenser lid and a valve assembly;

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
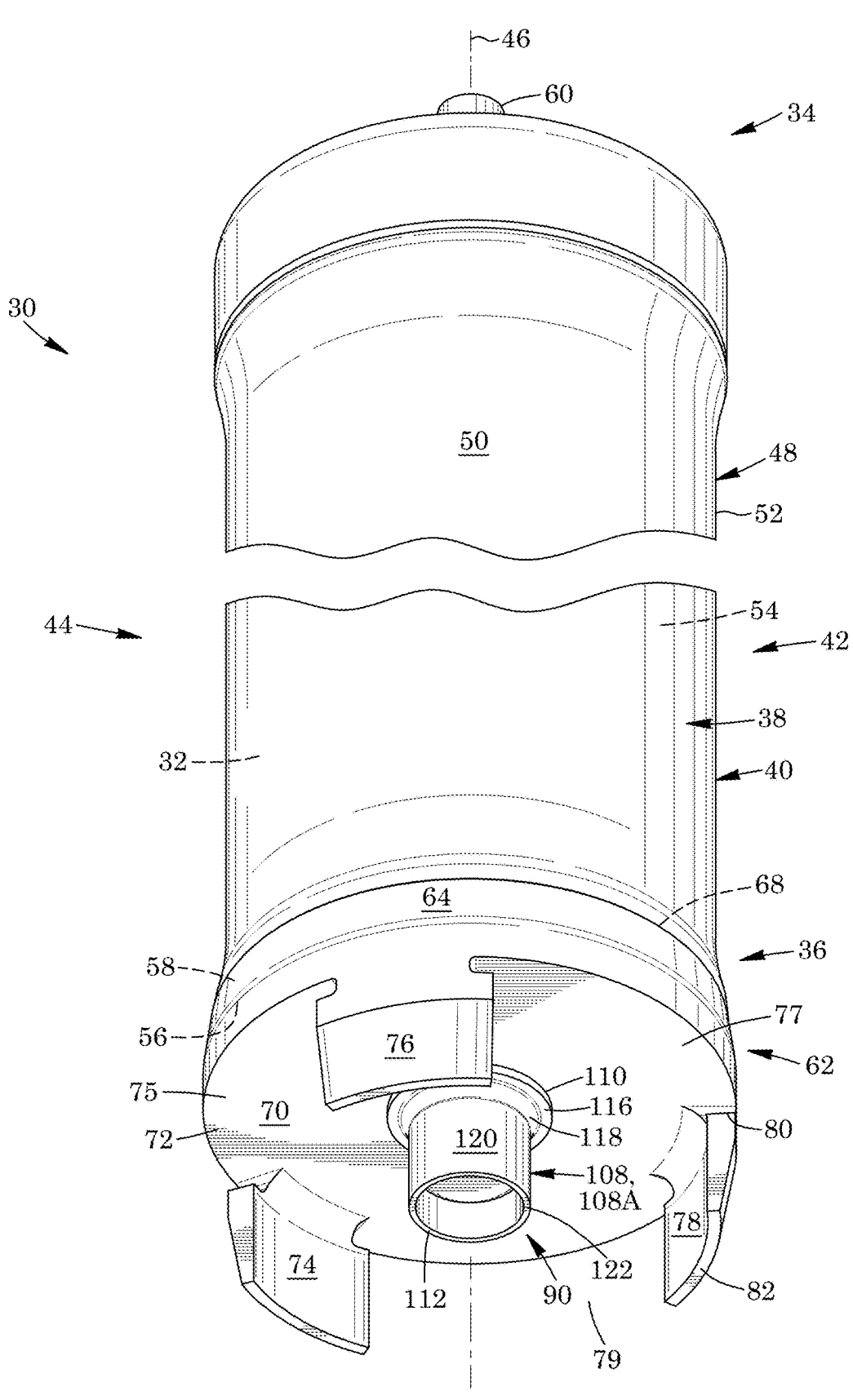
FIG. 1 is a bottom, front perspective view of a dispenser apparatus according to one aspect, the dispenser apparatus including a dispenser lid and a valve assembly.

Referring to the drawings and first to FIG. 1, there is shown a dispenser apparatus 30 for dispensing liquid foodstuff 32. The dispenser apparatus may comprise and/or be referred to as a bottle or canister in one non-limiting embodiment. However this is not strictly required and dispenser apparatus 30 may be a part of portion controlled dispenser where a plunger shifts axially to selectively expel the foodstuff in another non-limiting embodiment, for example. Foodstuff 32 in this non-limiting embodiment may comprise thin, non-viscous sauce to viscous liquids (e.g. oil/water to ketchup/mayonnaise based sauces).

Dispenser apparatus 30 has a top 34, a bottom 36 spaced-apart from the top thereof, a front 38, a rear 40 spaced-apart from the front thereof, and a pair of spaced-apart sides 42 and 44 extending between the front and rear thereof. The top and bottom of the dispenser apparatus extend between the front, rear and sides of the dispenser apparatus. Dispenser apparatus 30 has a longitudinal axis 46 extending between top 34 and bottom 36 thereof.

The dispenser apparatus includes an enclosure 48. The enclosure is hollow and elongate. Enclosure 48 is cylindrical in outer shape in this example; however this is not strictly required and the enclosure may have other shapes in other embodiments. The enclosure has an outer surface 50 and a periphery 52 which is circular in this example. Enclosure 48 has an interior 54 shaped to receive foodstuff 32 therewithin.

Dispenser apparatus 30 has an opening 56 via which foodstuff is selectively passed through and into enclosure 48. The opening aligns adjacent bottom 36 of the dispenser apparatus in this example, though this is not strictly required.

If dispenser apparatus 30 is in the form of a squeeze bottle or the like, the dispenser apparatus may include an air make-up or intake valve 60. The valve may comprise a pressure-release valve/or alternatively be in the form of a vent. Valve 60 functions to allow make up air into enclosure 48 to prevent prolonged collapse of enclosure 48 after being inwardly squeezed. The valve couples to enclosure 48. Valve 60 is in fluid communication with interior 54 of the enclosure. Air intake valves or vents per se, including their various parts and functionings, are known per se to one skilled in the art and valve 60 will accordingly not be described in further detail.

Dispenser apparatus 30 in this non-limiting embodiment includes a dispenser lid 62. However, this is not strictly required where, for example, enclosure 48 has an opening spaced above bottom 36 of the dispenser apparatus, such as adjacent top, front and/or sides thereof. Dispenser lid 62 may be referred to as a cap or a dispensing cap. The dispenser lid is configured to selectively couple to enclosure 48 so as to span and cover opening 56. The following non-limiting embodiment achieves this functionality.

Figures 2, 3:
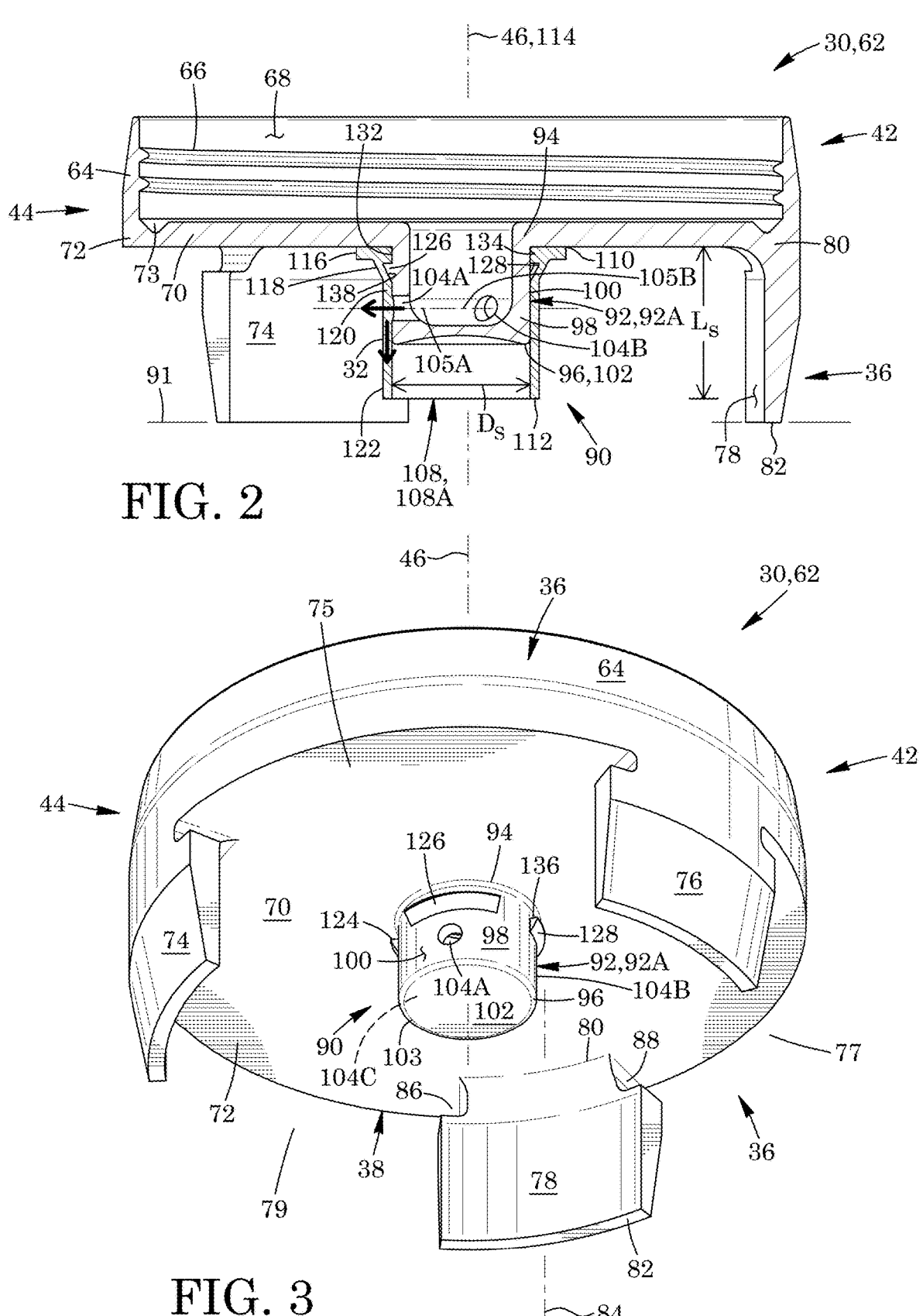
FIG. 2 is a sectional view of the dispenser lid thereof, with the valve assembly comprising a nozzle with radially-outwardly extending apertures and a valve extending about the nozzle.
FIG. 3 is a bottom, front perspective view of the dispenser lid thereof, with the valve being removed and not shown.

Dispenser lid 62 in this example threadably couples to enclosure 48. Enclosure 48 has a threaded end portion, in this example a male threaded end portion 58 which extends about and aligns with opening 56 in this non-limiting embodiment. As seen in FIG. 2, dispenser lid 62 includes a female end portion or member, in this example an annular tubular portion 64 with interior threading 66. The tubular portion of dispenser lid 62 is shaped to threadably couple to male threaded end portion 58 of enclosure 48 seen in FIG. 1.

Referring back to FIG. 2, dispenser lid 62 has an interior 68 about which the tubular portion extends. The interior of the dispenser lid is in fluid communication with interior 54 of enclosure 48 seen in FIG. 1. Dispenser lid 62 extends about and is coaxial with longitudinal axis 46 of dispenser apparatus 30 in this example.

As seen in FIG. 3, the dispenser lid includes a closure member, in this example a planar member 70. The planar member is laterally-extending. Planar member 70 is shaped to substantially span and in this example be coextensive with opening 56 of enclosure 48 seen in FIG. 1. Referring back to FIG. 3, planar member 70 is circular in top and bottom profile in this example. Tubular portion 64 of dispenser lid 62 couples to and extends axially outwards from the planer member. The tubular portion extends upwards from an outer peripheral portion 72 of planar member 70 of the dispenser lid in this example and from the perspective of FIG. 3. Tubular portion 64 of dispenser lid 62 is integrally connected to the planar member of the dispenser lid in this example so as to form a unitary whole.

As seen in FIG. 2, dispenser lid 62 has a recessed portion, in this example an outer annular groove 73. The groove faces interior 68. Groove 73 is V-shaped in lateral section in this example to maximize or facilitate cleanability of the dispenser lid. A seal (not shown) may be positioned within the groove or alternatively, male threaded end portion 58 of enclosure 48 seen in FIG. 1 may be received therein. Groove 73 of dispenser lid 62 so configured may facilitate or enable a double line seal on the inner and outer edge of dispenser apparatus 30.

As seen in FIG. 1, dispenser apparatus 30 includes one or more base members, in this example a plurality of base members 74, 76 and 78. However, this is not strictly required and there may be more or fewer base members in other embodiments. Each base member may be referred as a foot. Base members 74, 76 and 78 align with bottom 36 of dispenser apparatus 30 in this example. Referring back to FIG. 1, the base members function to support and elevate enclosure 48. The following is a non-limiting embodiment which achieves this functionality.

Each base member 74, 76 and 78 operatively couples to and extends axially outwards and in this example downwards from enclosure 48 from the perspective of FIG. 1. In this example each base member couples to and extends axially downwards from planar member 70 of dispenser lid. Base members 74, 76 and 78 may thus be said to form part of the dispenser lid in this example. However, this is not strictly required and the base members may directly couple to enclosure in other embodiments, for example. A plurality of circumferentially spaced recessed regions 75, 77 and 79 are interposed between base members 74, 76, 78, respectively.

Referring to FIG. 3, each base member 78 is elongated, with a proximal end 80 coupled to planar member 70 of dispenser lid 62, a distal end 82 axially spaced from the proximal end thereof, and a longitudinal axis 84 extending between the ends thereof. The longitudinal axes of the base members extend parallel to longitudinal axis 46 of dispenser apparatus 30 in this example. Each base member 78 has a pair of opposed and laterally-extending recessed regions 86 and 88 in this example adjacent proximal end 80 thereof; however this is not strictly required. Each base member tapers in a direction extending from proximal end 80 to distal end 82 thereof in this non-limiting embodiment. Base members 74, 76 and 78 are circumferentially spaced-apart. In this example the base members align about and couple to peripheral portion 72 of planar member 70 of dispenser lid 62.

As seen in FIG. 1, the base members align with outer surface 50 of enclosure 48 in this non-limiting embodiment. Base member 76 aligns with front 38 of dispenser apparatus 30, base member 74 aligns between rear 40 and side 42 of the dispenser apparatus and base member 76 aligns between the rear and side 44 of the dispenser apparatus; however, this is not strictly required. Each base member is generally rectangular in side provide in this example and arcuate-shaped; however here too this is not strictly required.

Still referring to FIG. 1, dispenser apparatus 30 includes a valve assembly 90. The valve assembly aligns adjacent bottom 36 of the dispenser apparatus in this example; however, this is not strictly required. Valve assembly 90 aligns and is coaxial with longitudinal axis 46 of dispenser apparatus 30 in this non-limiting embodiment. The valve assembly is in fluid communication with interior 54 of enclosure 48. As seen in FIG. 2, base members 74, 76 and 78 are shaped to space valve assembly 90 from a planar surface or counter 91 upon which dispenser apparatus 30 abuts or stands.

As seen in FIG. 3, valve assembly 90 includes an inner valve member 92. The inner valve member in this non-limiting example includes an elongate conduit, in this non-limiting case a nozzle 92A; however, this is not strictly required and in other embodiments the inner valve member may be said to not include a nozzle. Inner valve member 92 is rigid, at least in part, in this example and the nozzle may be referred to as a rigid first tube. Inner valve member 92 in this example is coaxial with longitudinal axis 46 of dispenser apparatus 30. In this non-limiting embodiment nozzle 92A couples to and extends axially outwards from planar member 70 of dispenser lid 62; however, this is not strictly required and in other embodiments inner valve member 92 may comprise a separate part, such as an insert for example. Nozzle 92A in this example extends downwards from the planar member from the perspective of FIG. 3. The nozzle thus operatively connects to enclosure 48 seen in FIG. 1 via dispenser lid 62 in this non-limiting embodiment. In further non-limiting embodiments nozzle 92A may couple directly to and extend downwards from enclosure 48 seen in FIG. 1, for example.

Referring back to FIG. 3, the nozzle is cylindrical in outer shape in this example; however, this is not strictly required and nozzles of other shapes may be used in other embodiments. As seen in FIG. 2, nozzle 92A has an open, first or proximal end 94 which couples to planar member 70 of dispenser lid 62. The nozzle is thus in fluid communication with interior 68 of the dispenser lid and interior 54 of enclosure 48 seen in FIG. 1 and therefore in communication with foodstuff 32.

As seen in FIG. 3, nozzle 92A has a closed, second or distal end 96 axially spaced from proximal end 94 thereof. The nozzle may thus be referred to as a closed-ended nozzle. Distal end 96 of nozzle 92A is positioned downwards from proximal end 94 of the nozzle from the perspective of FIG. 3. The nozzle includes a tubular portion 98 extending between the ends thereof. The tubular portion may be referred to as an outer wall of nozzle 92A. Tubular portion 98 of the nozzle has an outer surface 100. Inner valve member 92 includes an end member 102 aligned with distal end 96 of nozzle 92A. The end member is planar and circular in top/bottom profile in this example. End member 102 of inner valve member 92 couples to tubular portion 98 of the nozzle, in this example integrally connecting to the tubular portion of the nozzle so as to form a unitary whole. The end member has an outer periphery 103 axially aligned with outer surface 100 of the nozzle.

Referring to FIG. 3, inner valve member 92 has one or more apertures extending therethrough, in this non-limiting example a plurality of circumferentially spaced-apart and radially-extending apertures 104A, 140B and 104C in FIG. 3 extending through nozzle 92A. However, this is not strictly required, there may be fewer or more apertures in other embodiments and/or the apertures may extend in other orientations in other embodiments. As seen in FIG. 2, apertures 104A and 104B in this example extend about axes 105A and 105B that are perpendicular to longitudinal axis 46 of dispenser apparatus 30 in this example. The apertures extend through tubular portion 98 of nozzle 92A. Apertures 104A and 104B are positioned between ends 94 and 96 of the nozzle. The apertures are positioned to inhibit foodstuff 32 still within the nozzle from extending axially directly downward therefrom while still being within the nozzle. In this example apertures align adjacent distal end 96 and end member 102 of nozzle 92A. Apertures 104A and 104B extend through inner valve member 90 adjacent end member 102 in this example. The apertures are shaped to promote cleanability and to facilitate passing of particulate therethrough. Apertures 104A and 104B are arranged to provide dispensing of foodstuff 32 that is up to 360 degrees around nozzle 92A in this example. The apertures are shaped and arranged to minimize the force required to dispense liquid/foodstuff and inhibit the likelihood of a fluid jet. Apertures 104A and 104B may be relatively large with a diameter of 6 mm in one non-limiting embodiment; however, this is not strictly required and the apertures may be larger or smaller in other embodiments.

As seen in FIG. 1, valve assembly 90 includes an outer valve member 108A. The outer valve member comprises a resilient member, in this example a tubular resilient member, in this case a valve 108A. The valve may be referred to as a sheath. Valve 108A is more resilient than nozzle 92A seen in FIG. 2. Outer valve member 108A is an elastomer in this example; however, this is not strictly required and the valve may be made of other resilient or elastic type materials in other embodiments.

Referring to FIG. 2, the valve has a first or proximal end 110 and a second or distal end 112 axially spaced from the proximal end thereof. Valve 108A has a total length $L_S$ extending between the ends thereof. The valve has a longitudinal axis 114 extending between ends 110 and 112 thereof. The longitudinal axis of valve 108A is coaxial with longitudinal axis 46 of dispenser apparatus 30. Valve 108A is configured to extend substantially vertically from distal end 112 thereof towards proximal end 110 thereof when in use in one non-limiting embodiment; however, this is not strictly required.

The distal end of the valve is radially and axially inwardly spaced from distal ends 82 of base members 76 and 78 in this example. The distal end of the valve is axially positioned between distal end 96 of nozzle 92A and the distal ends of the base members in this example. This configuration may be suited for foodstuff comprising less viscous liquids (e.g. water and the like), as valve 108A so shaped and axially-outwardly extending, may function to help shape the stream of foodstuff exiting therefrom. However, the above configuration is not strictly required. For example, distal end 112 of valve 108A may align with and/or be adjacent distal end 96 of nozzle 92A for foodstuff comprising more viscous liquids. In the other embodiments, the distal end of the nozzle may be positioned axially outwards/downwards relative to the distal end of the valve.

As seen in FIG. 1, outer valve member 108 includes a flange portion 116 that is annular in this example. The flange portion couples to valve 108A and in this non-limiting example is integrally connected thereto so as to form a unitary whole. In other embodiments, outer valve member 108 collectively may be referred to as the valve. Flange portion 116 of outer valve member 108 aligns with proximal end 110 of the valve. The outer valve member in this example includes an intermediary portion, in this non-limiting embodiment an outwardly flared portion 118; however, this is not strictly required. The outwardly flared portion of outer valve member 108 couples to and extends axially outwards from flange portion 116 of the valve towards distal end 112 of valve 108. Outwardly flared portion 118 of the outer valve member is annular in this example and tapers/extends downwards from flange portion 116 of the outer valve member from the perspective of FIG. 1.

Valve 108A comprises a tubular portion 120. The tubular portion of valve 108A operatively couples to and extends axially outwards relative to flange portion 116 of outer valve member 108, in this example via flared portion 118 of the outer valve member. Tubular portion 120 is coaxial with axes 46 and 114 of dispenser apparatus 30 and valve 108A, respectively. The tubular portion of the valve extends downwards from the flared portion of the valve in this example from the perspective of FIG. 1. Flange portion 116 of outer valve member 108 extends radially outwards from tubular portion 120 of valve 108A. As seen in FIG. 2, valve 108A

(and in this example the tubular portion thereof) has a substantially constant diameter $D_S$ in this non-limiting embodiment about or adjacent nozzle 92A.

The tubular portion of the valve is configured to extend substantially vertically when in use in this non-limiting embodiment; however, this is not strictly required. Tubular portion 120 of valve 108A is shaped to extend about, parallel to and axially outwards from outer surface 100 of nozzle 92A.

Valve 108A is configured to enclose apertures 104A and 104B, in this non-limiting example via tubular portion 120 thereof. The valve is shaped to inhibit foodstuff 32 from exiting from the apertures. Referring to FIG. 1, valve assembly 90 is actuated upon pressure within interior 54 of enclosure 48, and thus pressure within nozzle 92A seen in FIG. 2, exceeding a predetermined threshold. In practice this may occur by selectively squeezing the enclosure inwards so as to promote a reduction in volume thereof. Referring to FIG. 2, valve 108A is configured to inhibit foodstuff 32 from passing through nozzle 92A via apertures 104A and 104B until pressure within the nozzle exceeds the predetermined threshold. Thus, outer valve member 108 (or at least valve 108A thereof) is configured to inhibit foodstuff from passing therethrough until pressure acting thereon exceeds a predetermined threshold.

Tubular portion 120 of the valve is configured to selectively expand resiliently outwards upon pressure within nozzle 92A exceeding the predetermined threshold, for example by inwardly squeezing the enclosure to propel foodstuff therein outwards therefrom. Actuation of valve assembly 90 causes an annular passageway to be formed between nozzle 92A and valve 108A (extending from apertures 104A and 104B) at least to distal end 96 of the nozzle) and via through which foodstuff 32 may selectively pass. Thus, actuation of the valve assembly selectively enables foodstuff to exit from the apertures and past the valve. The predetermined pressure threshold which enables actuation of the valve may be a function of and be altered based on the design of the valve, including its shape (including length, diameter and/or thickness), resiliency and/or material properties, all of which affect the extent to which the valve inhibits selective expansion/opening. In the alternative, the term "valve" may be used to refer to tubular portion 120 and nozzle 92A collectively.

Valve 108A includes an outwardly axially hanging or distal end portion 122 that in this non-limiting example extends axially outwards from and relative to distal end 96 of nozzle 92A. The distal end portion of the valve may be referred to as an axially-extending distal portion of outer valve member 108. Distal end portion 122 of valve 108A is coaxial with axes 46 and 114 of dispenser apparatus 30 and the valve, respectively. The distal end portion of the valve may be said to be a part of tubular portion 120 of the valve. The distal end portion of the valve is shaped to promote falling off or removal of foodstuff downwards therefrom via gravity. Distal end portion 122 of valve 108A is equal to or greater than a quarter than the total length $L_S$ of the valve in one non-limiting embodiment. The distal end portion of the valve is equal to or greater than a third than the total length of the valve in another non-limiting embodiment.

Referring to FIGS. 2 and 3, inner valve member 92 and outer valve member 108 couple together via male and female members in this example. Valve assembly 90 in this non-limiting embodiment includes one or more male members in the form of one or more and in this example a plurality of stops 124, 126 and 128. However, this is not strictly required and there may one or two stops or four or more stops in other embodiments. As seen in FIG. 2, stops 126 and 128 couple to one of inner valve member 92 and outer valve member 108, in this example of the inner valve member. Each stop is shaped to constrain movement of the outer valve member relative to the inner valve member in three orthogonal directions and/or axially and radially. Stops 126 and 128 are configured to inhibit axial movement of the outer valve member relative to the inner valve member until pressure acting thereon exceeds a predetermined threshold. The stops are configured to selectively enable movement of outer valve member 108 axially and/or radially relative to inner valve member 92 while inhibiting rotation the outer valve member relative to the inner valve member. The following non-limiting embodiment achieves this functionality.

Referring to FIG. 3, stops 124, 126 and 128 are circumferentially spaced-apart and extend radially outwards from nozzle 92A. The stops are shaped to inhibit movement of valve 108A relative to the nozzle both axially and circumferentially. Stops 124, 126 and 128 are integrally connected to nozzle 92A so as to form a unitary whole in this example. Base members 74, 76 and 78 are circumferentially spaced between respective ones of the stops at least in part in this non-limiting embodiment. As seen in FIG. 2, stops 124 and 128 are positioned adjacent proximal end 94 of nozzle 92A in this example. Flange portion 116 of outer valve member 108 is positioned between and abuts the stops and planar member 70 of dispenser lid 62. The planar member of the dispenser lid and stops 124 and 128 are positioned to form circumferentially spaced-apart and radially-extending recessed portions 132 and 134. The recessed portions are shaped to receive flange portion 116 of outer valve member 108 therebetween such that planar member 70 of dispenser lid 62 and stops 124 and 128 bias or compress the flange portion of the outer valve member therebetween.

Referring to FIG. 3, each of stops 124, 126 and 128 has a planar surface 136 facing proximal end 94 of nozzle 92A. The planar surfaces of the stops extend between the proximal end and distal end 96 of the nozzle. Planar surfaces 136 are rectangular in this non-limiting embodiment. Each of stops 124, 126 and 128 tapers in a direction extending from proximal end 94 to distal end 96 of nozzle 92A in this non-limiting embodiment; however, this is not strictly required. Each stop is triangular in lateral section in this non-limiting embodiment. Each of stops 124, 126 and 128 is a triangular prism at least in part in this example. Each stop is wedge-shaped at least in part in this non-limiting embodiment. Each of stops 124, 126 and 128 is arc-shaped or annular at least in part in this example. Stops 124, 126 and 128 are circumferentially space-apart about and extend radially outwards from outer surface 100 of nozzle 92A. As seen in FIG. 2, each of stops 124, 126 and 128 aligns with a respective one of apertures 104A and 104B of the nozzle in this example; however this is not strictly required. The apertures of the nozzle are axially spaced from the stops. Apertures 104A and 104B are positioned upwards from stops 126 and 128 from the perspective of FIG. 2.

One or more female members, in this example one or more recesses, in this case annular groove 138 is formed in another of outer valve member 108 and inner valve member 92, in this example the outer valve member. The annular groove is shaped to mate at least in part with stops 126 and 128. The following is a non-limiting embodiment which achieves this functionality.

Annual groove 138 of outer valve member 108 is radially inwardly-facing and aligns with and is part of flared portion 118 of the outer valve member in this example. The flared portion of the outer valve member is thus shaped to receive respective ones of stops 126 and 128. Annual groove 138 aligns with the stops. The annular groove of outer valve member 108 is arc-shaped at least in part. Annular groove 138 of the outer valve member is triangular in lateral section in this example; however, this is not strictly required. Stops 126 and 128 extend between nozzle 92A and outer valve member 108. Each stop may be referred to as a ledge coupled to and extending radially outwards from the nozzle and upon which the valve is suspended. Flange portion 116 and flared portion 118 may be referred to as an enlarged proximal end portion of valve 108A via which the valve is suspended from the one or more ledges.

Flange portion 116 of outer valve member 108 may be shaped/formed when the valve extends about stops 126 and 128, with the outer valve member otherwise when not in use substantially comprising tubular portion 120 coupled to and extending axially outwards from the flange portion of the outer valve member. In other embodiments, the flange portion of outer valve member 108 is pre-formed to be so shaped regardless of whether the outer valve member is in use and extending about the stops and nozzle 92A.

FIGS. 4 to 8 shows a dispenser apparatus 30.1 according to another aspect. Like parts have like numbers and functions as dispenser apparatus 30 shown in FIGS. 1 to 3 with the addition of decimal extension "0.1". Dispenser apparatus 30.1 is substantially the same as dispenser apparatus 30 shown in FIGS. 1 to 3 with at least the following exceptions.

Figures 5, 6:
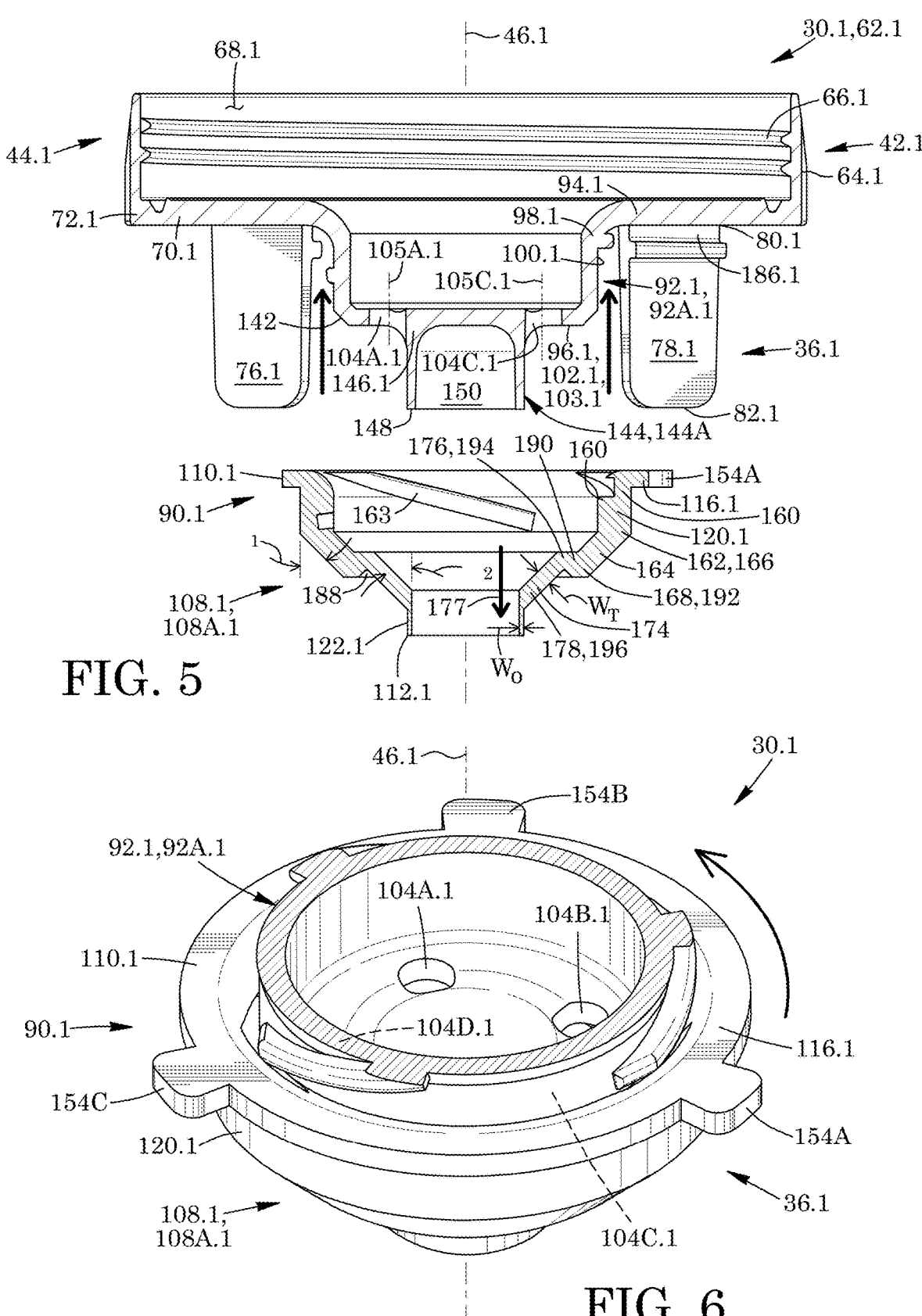
FIG. 5 is an exploded sectional view of the dispenser lid and valve assembly of FIG. 4, with a valve of the valve assembly being shown in the process of coupling to a nozzle of the valve assembly and dispenser lid.
FIG. 6 is a top, front perspective view of the valve assembly thereof, with the valve shown in the process of threadably coupling to the nozzle, and with the rest of the dispenser lid not being shown.

As seen in FIG. 6, inner valve member 92.1 has one or more axially-extending apertures, in this example a plurality of circumferentially spaced-apart and axially-extending apertures extending therethrough, in this case four apertures 104A.1, 104B.1, 104C.1 and 104D.1. However, this is not strictly required and fewer or additional axially-extending apertures may be provided in other embodiments. Apertures 104A.1, 104B.1, 104C.1 and 104D.1 extend through end member 102.1 of inner valve member 90.1. The apertures in this non-limiting example are in fluid communication with and may be said to extend through nozzle 92A.1. As seen in FIG. 5, apertures 104A.1 and 104C.1 extend about axes 105A.1 and 105C.1 that are parallel to longitudinal axis 46.1 of dispenser apparatus 30.1 in this example. The apertures so vertically-extending arranged in use, may enable valve assembly 109.1 to be actuated in a manner which inhibits or minimizes downward force (applied by foodstuff/fluid) on inner valve member 108.1 and/or valve 108A.1.

Nozzle 92A.1 has a slanted distal shoulder 142 in this non-limiting example. The slanted distal should extends axially in an outwardly flared direction from distal end 96.1 of the nozzle towards proximal end 94.1 of the nozzle. Nozzle 92A.1 may thus be said to comprise a bevelled end member 102.1 in this example.

Figures 7, 8:
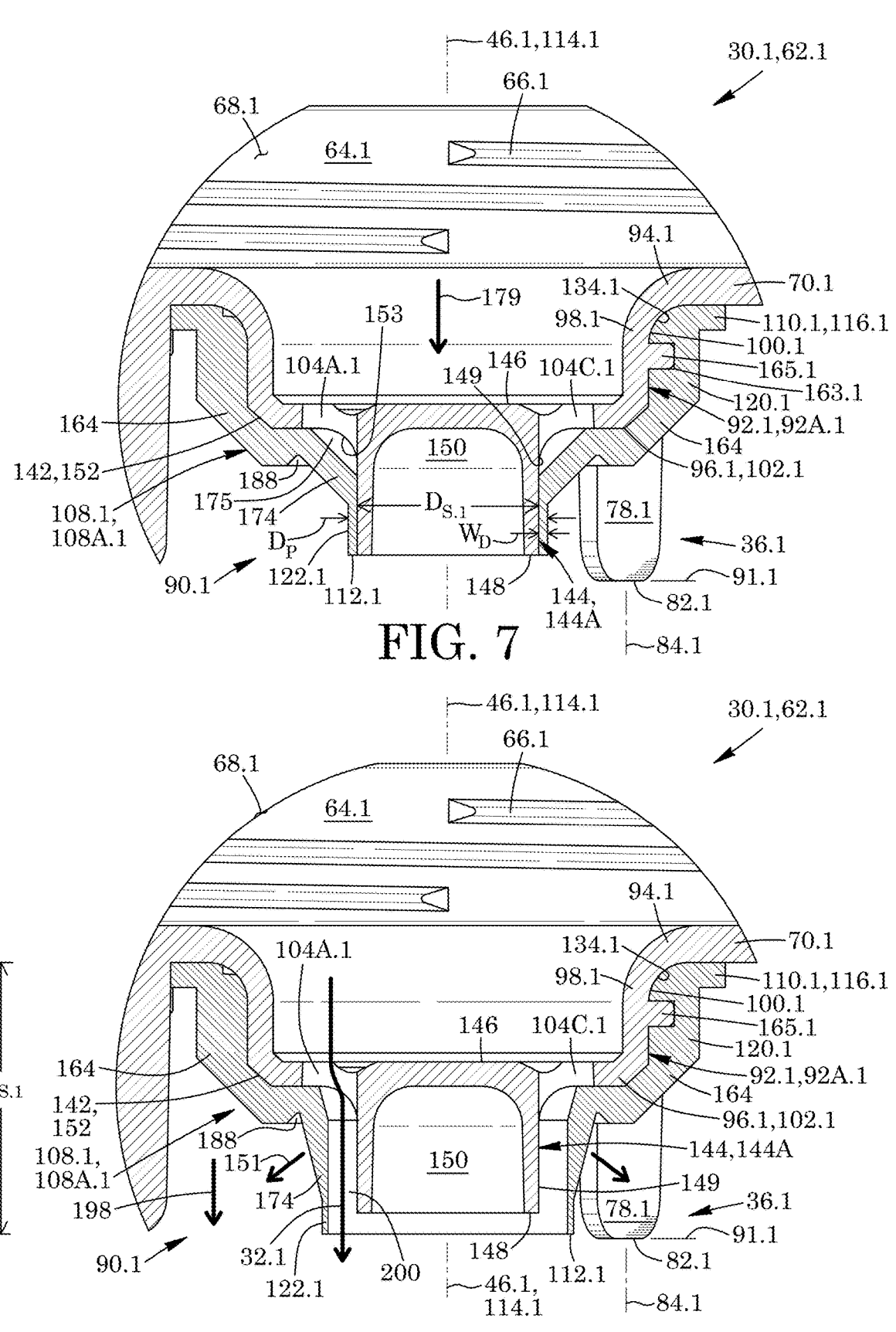
FIG. 7 is a sectional view of the dispenser lid and valve assembly of FIG. 4 shown in fragment, with the valve assembly being shown in a non-actuated position.
FIG. 8 is a sectional view of the dispenser lid and valve assembly of FIG. 4 shown in fragment, with the valve assembly being shown in an actuated position so as to enable foodstuff from the dispenser apparatus to pass therethrough.

Inner valve member 92.1 of valve assembly 90.1 includes a protrusion 144. The protrusion couples to and extends axially outwards from nozzle 92A.1; alternatively, the protrusion may be said to comprise a part of the nozzle. As seen in FIGS. 7 and 8, valve 108A.1 of outer valve member 108.1 extends about and is configured to move both axially and radially outwards relative to protrusion 144 to selectively enable foodstuff 32.1 to pass therethrough. The following is a non-limiting embodiment which achieves this functionality.

Protrusion 144 extends downwards from nozzle 92A.1 from the perspective of FIG. 5. The protrusion in this example is tubular in shape and may be referred to a second conduit; however, this is not strictly required and the protrusion may be solid in other embodiments, for example.

Protrusion 144 has a first or proximal end 146 and a second or distal end 148 axially spaced from the proximal end thereof. The proximal end of the protrusion couples to distal end 96.1 of nozzle 92A.1. Protrusion 144 is integrally connected to end member 102.1 of inner nozzle member 92.1 so as to form a unitary whole in this non-limiting embodiment. The end member extends radially outwards from the protrusion with periphery 103.1 thereof being radially spaced from the protrusion. End member 102.1 of inner valve member 92.1 may be referred to as a laterally-extending end member of the inner valve member and/or a radially outwardly-extending flange relative to protrusion 144. The protrusion and end member are integrally connected so as to form a unitary whole in this non-limiting embodiment.

Apertures 104A.1 and 104C.1 extend about exterior 144A of and are adjacent proximal end 146 of protrusion 144 in this example. Proximal end 146 of the protrusion is closed, distal end 148 of the protrusion is open and the protrusion is hollow, with a bore 150 extending from the proximal to the distal end of the protrusion in this embodiment; however, this is not strictly required. The bore is coaxial with longitudinal axis 46.1 of dispenser apparatus 30.1 in this example. The protrusion has an outer surface 149 extending between ends 146 and 148 thereof.

As seen in FIG. 7, end member 102.1 of nozzle 92A.1 transitions in a streamline manner to the outer surface of protrusion 144 via an annular fillet 153. The fillet faces axially outwards/downwards in part and radially outwards in part.

As seen in FIG. 7, valve 108A.1 extends about nozzle 92A.1 and protrusion 144. Tubular portion 120 of the valve couples to the nozzle via an interference fit in this example. The interference fit may be 8 to 12%: that is the inner shape/diameter(s) of valve 108A.1 may be 8 to 12% smaller than the corresponding outer diameter(s) of nozzle 92A.1 and protrusion 144 in one non-limiting embodiment. However, this is not strictly required and the valve may be relatively larger or smaller in other embodiments. Nozzle 92A.1 and valve 108A.1 are configured to inhibit space therebetween. The valve may be referred to as a resilient second tube extending about and axially outwards from the first tube or nozzle.

As seen in FIG. 7, distal end portion 122.1 of valve 108A.1 extends about protrusion 144. The protrusion has an outer diameter $D_P$ which is substantially equal to inner diameter $D_S$ of the distal end portion the valve when the valve extends about the protrusion and the valve is in an non-actuated state. Distal end portion 122.1 of valve 108A.1 is thin-walled in this non-limiting embodiment. The distal end portion has a wall thickness $W_D$ which is less than that of the rest of the valve. The thin walled, inwardly-concave shape of the distal end portion of valve 108A.1 may function to reduce the tendency of foodstuff comprising thicker fluids from forming a meniscus and staying attached after dispensing operation. Distal end portion 122.1 of valve 108A.1 is axially aligned, or aligns in an axial direction, with apertures 104A.1 and 104C.1 extending through end member 102.1 of nozzle 92A.1 in this non-limiting embodiment. The distal end portion of the valve extends parallel to and about outer surface 149 of protrusion 144 so as to inhibit space therebetween. The distal end portion of the valve couples to the protrusion via an interference fit in this example.

Distal end 112.1 of valve 108A.1 aligns with distal end 148 of protrusion 144 in this non-limiting embodiment when valve assembly 90.1 is a non-actuated state seen in FIG. 7; however, this is not strictly required. As seen in FIG. 8, actuation of the valve assembly causes distal end portion 122.1 of valve 108A.1 to extend radially and axially outwards (and downwards from the perspective of FIG. 8) from distal end 148 of the protrusion in this example, as seen by arrow 151.

Referring to FIGS. 4 to 7, valve 108A.1 threadably couples to nozzle 92A.1 so as to promote a compression seal 152 between the tubular portion thereof and the nozzle. The following is non-limiting example which achieves this functionality.

As seen in FIG. 6, outer valve member 108.1 includes one or more radially outwardly-extending flanges, in this non-limiting example a plurality of circumferentially spaced-apart tabs 154A, 154B and 154C coupled to and extending radially outwards from flange portion 116.1 thereof. Alternatively, the tabs may be considered parts of the flange portion of the valve.

As seen in FIG. 5, valve 108A.1 includes a first tubular portion 120.1 coupled to and extending axially outwards (and downwards from the perspective of FIG. 5) from flange portion 116.1 thereof. The first tubular portion of the valve has a first or proximal end 160 coupled to tabs 154 and a second or distal end 162 axially spaced from the proximal end thereof.

Referring to FIG. 5, outer valve member 108.1 is pushed axially towards inner valve member 92.1 including nozzle 92A.1 thereof. Referring to FIGS. 6 and 7, valve 108A.1 selectively threadably couple to the nozzle via threading 163 coupled to and extending radially inwards of first tubular portion 120.1 thereof. Threading 163 engages with corresponding threading 165 of nozzle 92A.1 coupled to and extending radially outwards from outer surface 100.1 of the nozzle.

Referring back to FIG. 5, valve 108A.1 includes a second tubular portion 164 coupled to and extending axially outwards and radially inwards from first tubular portion 120.1 thereof. The second tubular portion of the valve has a first or proximal end 166 coupled to and in this example integrally formed with distal end 162 of the first tubular portion of the valve. Second tubular portion 164 of valve 108A.1 has a second or distal end 168 radially inwardly and axially outwardly spaced from the proximal end thereof. The second tubular portion of the valve is slanted in this example. Second tubular portion 164 of valve 108A.1 extends axially-outwards/radially-inwards at a first angle $\alpha_1$ relative to first tubular portion 120.1 of the valve. As seen in FIG. 7, second tubular portion 164 of valve 108A.1 is shaped to sealably abut slanted distal shoulder 142 of nozzle 92A.1. The valve threadably couples to the nozzle so as to promote compression seal 152 between the second tubular portion thereof and the slanted distal shoulder of the nozzle in this example. Threading 165.1 of dispenser lid 62.1 thus engage valve 108A.1, locking the valve into position and creating tension on the compression seal. Compression seal 152 so arranged may comprise an interference fit with an optimized length and angle. The interference fit may be 8 to 12%: that is the inner shape/diameters of valve 108A.1 may be 8 to 12% smaller than the corresponding outer diameters of nozzle 92A.1 and protrusion 144 in one non-limiting embodiment. However, this is not strictly required and the valve may be relatively larger or smaller in other embodiments.

Figure 4:
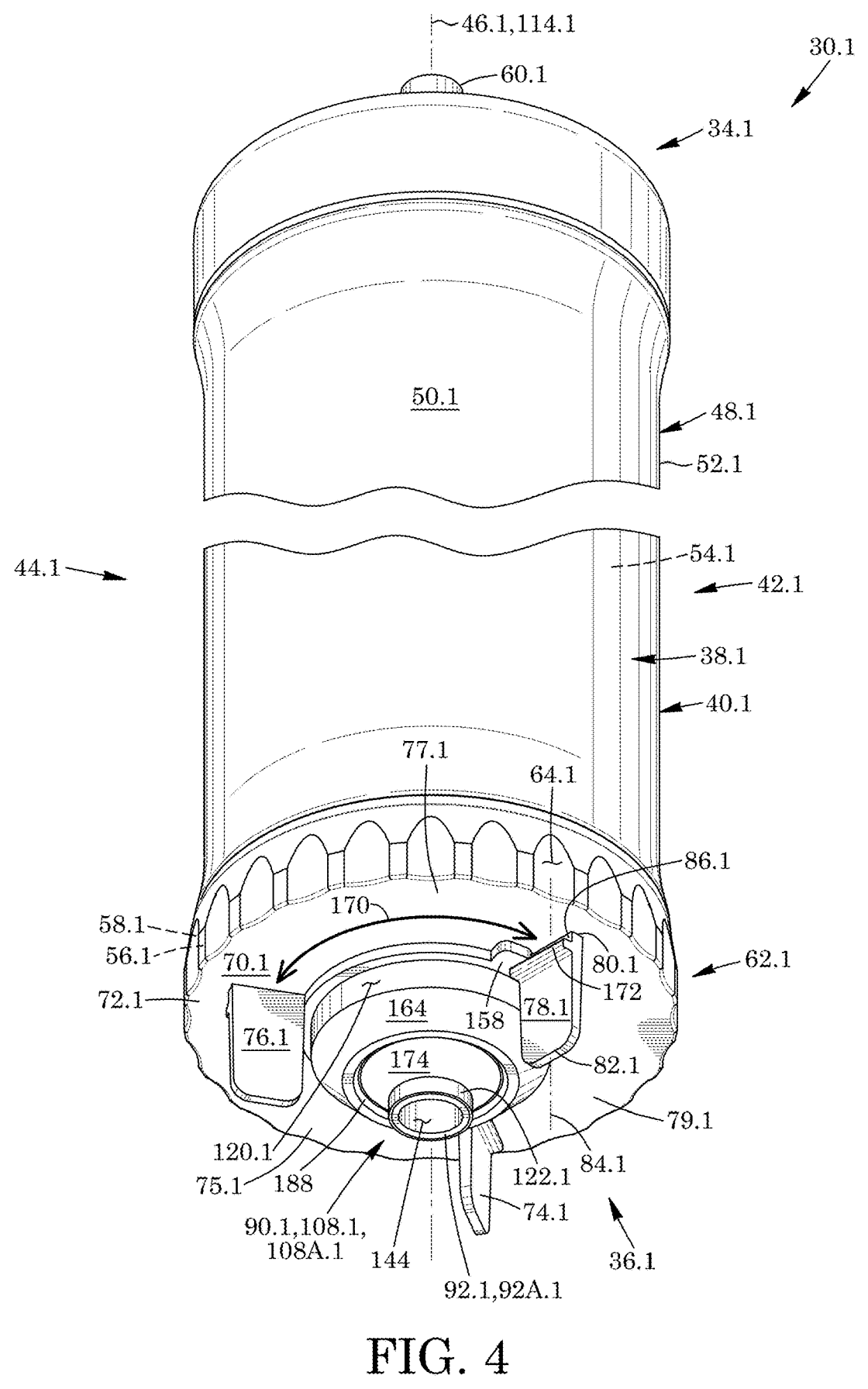

As seen in FIG. 4, base members 74.1, 76.1 and 78.1 are shaped to inhibit rotational and axial movement of valve assembly 90.1 upon the valve assembly being threaded in place. Each base member is shaped to bias valve 108A.1 against nozzle 92A.1. The following non-limiting embodiment achieves this functionality.

Valve assembly 90.1 is rotatable relative to the base members (as shown by arrow 170) from a first or uncoupled position, to a second or coupled position seen in FIG. 4, in which movement of the valve assembly relative to base members 74.1, 76.1 and 78.1 is inhibited. Each base member is shaped to abut a respective one of tabs 158 of valve 108A.1 when the valve assembly is threaded in place. Each base member 78.1 has a recessed region 186.1 shaped to fit a respective tab at least partially therein. Each base member includes a laterally-extending protuberance 172 coupled thereto. Each protuberance is shaped to abut in part against a respective tab 158 so as axially compress the tab and thus valve 108A.1 against planar member 70.1 of dispenser lid 62.1. Each protuberance is laterally-extending and a rectangular prism in shape in this non-limiting embodiment. Base members 78.1 so shaped thus functions as stops and a locking mechanism for valve assembly 90.1. Locking feature of the base members may provide visual indicia that valve 108A.1 is locked in place as well as functioning as a physical stop for the valve.

Referring to FIG. 5, valve 108A.1 includes a third tubular portion 174 coupled to and extending axially outwards and radially inwards relative to second tubular portion 164 thereof. As seen in FIG. 4, the valve as herein described may thus be said to be conical at least in part. Referring back to FIG. 5, third tubular portion 174 of valve 108A.1 is slanted in this example and may be referred to as a sleeve or tapered sleeve or intermediate portion that couples together radially-extending and axially-extending portions of the valve and which tapers in a direction 177 extending from the radially-extending to axially-extending portions of the valve. Third tubular portion 174 of the valve has a first or proximal end 176 operatively connected to distal end 168 of second tubular portion 164 of the valve. The third tubular portion of valve 108A.1 has a second or distal end 178 spaced-apart from the proximal end thereof.

Third tubular portion 174 of the valve has a wall thickness $W_T$ which is less than that of first tubular portion 120.1 and second tubular portion 164 of the valve in this non-limiting embodiment. As seen in FIG. 7, the third tubular portion of valve 108A.1 is shaped to align with and cover apertures 104A.1 and 104C.1 in a non-actuated state of valve assembly 90.1 seen in FIG. 7. An annular space 175 is formed between third tubular portion 174 of valve 108A.1 and apertures 104A.1 and 104C.1. The annular space tapers in a direction 179 extending from the apertures to the third tubular portion of the valve. Annular space 175 is triangular in lateral section in this example and may be referred to as an annular recessed region.

Actuation of valve assembly 90.1 causes third tubular portion 174 of the valve to move axially outwards relative to second tubular portion 164 of the valve as seen in FIG. 8 by arrow 151. Actuation of valve assembly 90.1 causes the third tubular portion of the valve to move radially outwards relative to the second tubular portion of the valve. Actuation of the valve assembly causes third tubular portion 174 of valve 108A to move towards an at least partially non-slanted position more in-line and/or parallel to axes 46.1 and 114.1 of dispenser apparatus 30.1 and the valve, respectively.

Referring to FIG. 5, valve assembly 90.1 has one or more recessed regions, in this example a recessed region 188 between second tubular portion 164 and third tubular portion 174 of valve 108A.1 in this example. The recessed region facilitates movement of the third tubular portion of the valve radially and axially outwards relative to the second tubular portion of the valve. Valve 108A.1 is locally reduced to minimize the force required to actuate valve assembly 109.1.

During actuation, the valve in part moves down and away from protrusion 144, allowing the lower portion of the valve to expand away from nozzle 92A.1. The following is a non-limiting embodiment of recessed regions which achieve this functionality of enabling/facilitating movement of distal end portion 122.1 of the valve axially and radially outwards to enable foodstuff to pass therethrough.

As seen in FIG. 7, recessed region 188 of valve 108A.1 aligns with apertures 104A.1 and 104C.1 in this example. As seen in FIG. 5, the recessed region of the valve aligns adjacent distal end 168 of second tubular portion 164 of the valve and aligns adjacent proximal end 176 of third tubular portion 174 of the valve in this example. Recessed region 188 is axially outwardly facing in this non-limiting embodiment. The recessed region is annular in this example. Recessed region 188 is triangular shaped in lateral section in this non-limiting embodiment.

Still referring to FIG. 5, valve 108A.1 includes a second flange 190 in this example. The second flange of the valve is shaped to promote outward pivoting of third tubular portion 174 relative to the second flange. Second flange 190 of valve 108A.1 extends radially between and couples together second tubular portion 164 and third tubular portion 174. Referring to FIG. 7, the second flange of the valve may be referred to as a radially-inwardly extending annular portion of valve 108A.1 which extends about and abuts end member 102.1. As seen in FIG. 5, second flange 190 of the valve has a first or proximal end 192 coupled to and in this example integrally formed with distal end 168 of the second tubular portion of the valve. The second flange of valve 108A. 1 has a second or distal end 194 radially inwardly spaced from the proximal end thereof. The distal end of second flange 190 of the valve couples to and in this example is integrally formed with proximal end 176 of third tubular portion 174 of the valve. The second flange of valve 108A.1 has recessed region 188 therewithin in this example.

As seen in FIG. 5, distal end portion 122.1 of valve 108A.1 may be referred to as a fourth tubular portion of the valve. Wall thickness $W_D$ of the distal end portion of valve 108A.1 is less than that of first tubular portion 120.1, second tubular portion 164 and third tubular portion 174 of the valve in this example. Distal end portion 122.1 of the valve couples to and extends axially outwards from third tubular portion 174.1 thereof. The distal end portion of valve 108A.1 has a first or proximal end 196 coupled to and in this example integrally formed with distal end 178.1 of the third tubular portion of the valve. Distal end 112.1 of valve 108A.1 is axially outwardly spaced from proximal end 196 of distal end portion 122.1 of the valve and may be referred to as the distal end of the distal end portion of the valve.

Third tubular portion 174 of the valve outwardly flares axially/radially outwards at a second angle $\alpha_2$ relative to distal end portion 122.1 of the valve. First angle $\alpha 1$ is substantially equal to second angle $\alpha_2$ in this example; however, this is not strictly required. Second tubular portion 164 and third tubular portion 174 of valve 108A.1 each extend along substantially the same slope in this example, in this case a slope of 45 degrees; however, this is not strictly required and the slope may be different and/or not the same in other embodiments.

As seen in FIG. 8, actuation of valve assembly 90.1 causes an annular passageway 200 to be formed between protrusion 144 and portions 174 and 122.1 of valve 108A.1. The valve is shaped such that the annular passageway aligns with apertures 104A.1 and 104C.1. Third tubular portion 174 of the valve is made of a wall that tapers in a direction 198 extending from second tubular portion 164 to distal end portion 122.1 of the valve when valve assembly 90.1 is actuated in this non-limiting embodiment. As seen in FIGS. 7 and 8, the third tubular portion of valve 108A.1 is thus configured to facilitate movement of the distal end portion 122.1 of outer valve member 108.1 axially and radially outwards from protrusion 144 of inner valve member 92.1 when the valve is actuated. Third tubular portion 174 is configured to be less angled/slanted when the valve is actuated.

Figure 9:
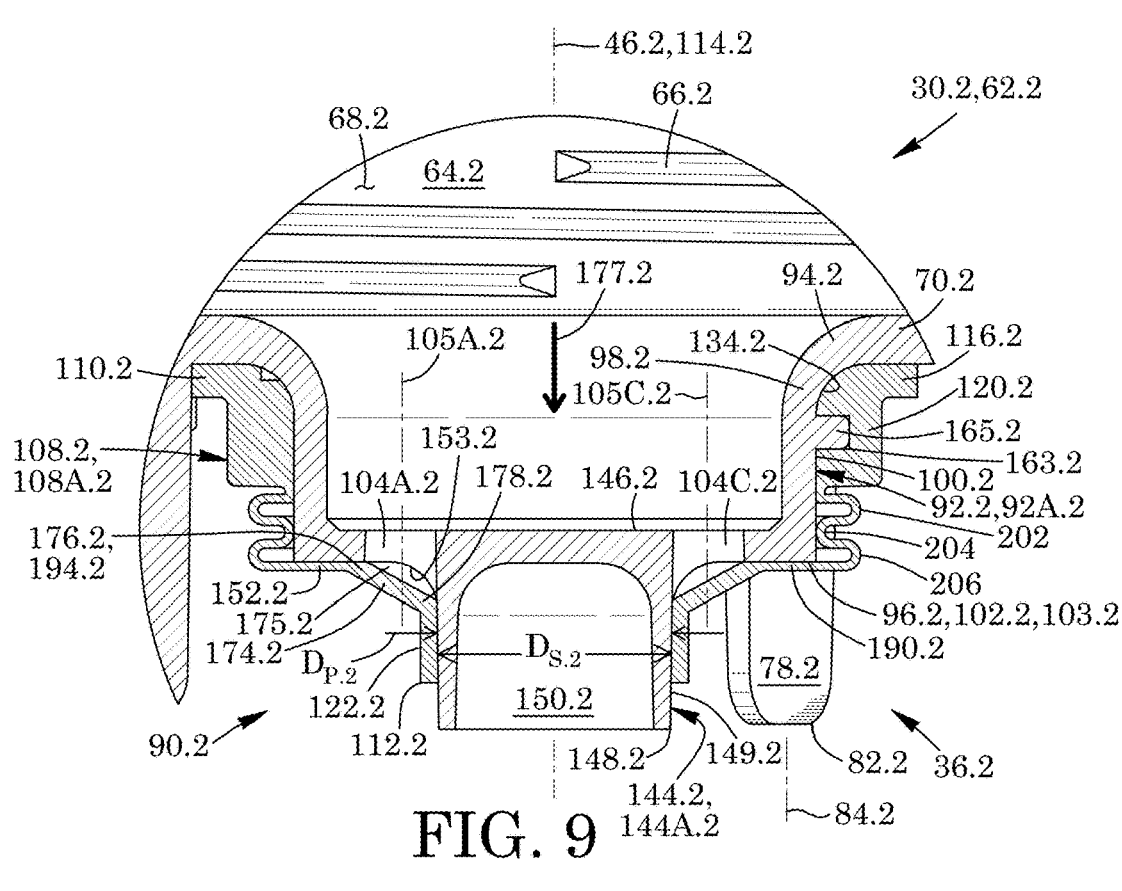
FIG. 9 is a sectional view of a dispenser apparatus with a valve assembly according to a further aspect, the dispenser apparatus being shown in fragment, the valve assembly including a nozzle having axially-extending apertures and including a protrusion axially extending outwards therefrom, the valve assembly including a valve longitudinally-folded in part and extending about the nozzle and protrusion, and the valve assembly being shown in a non-actuated position.
Figure 10:
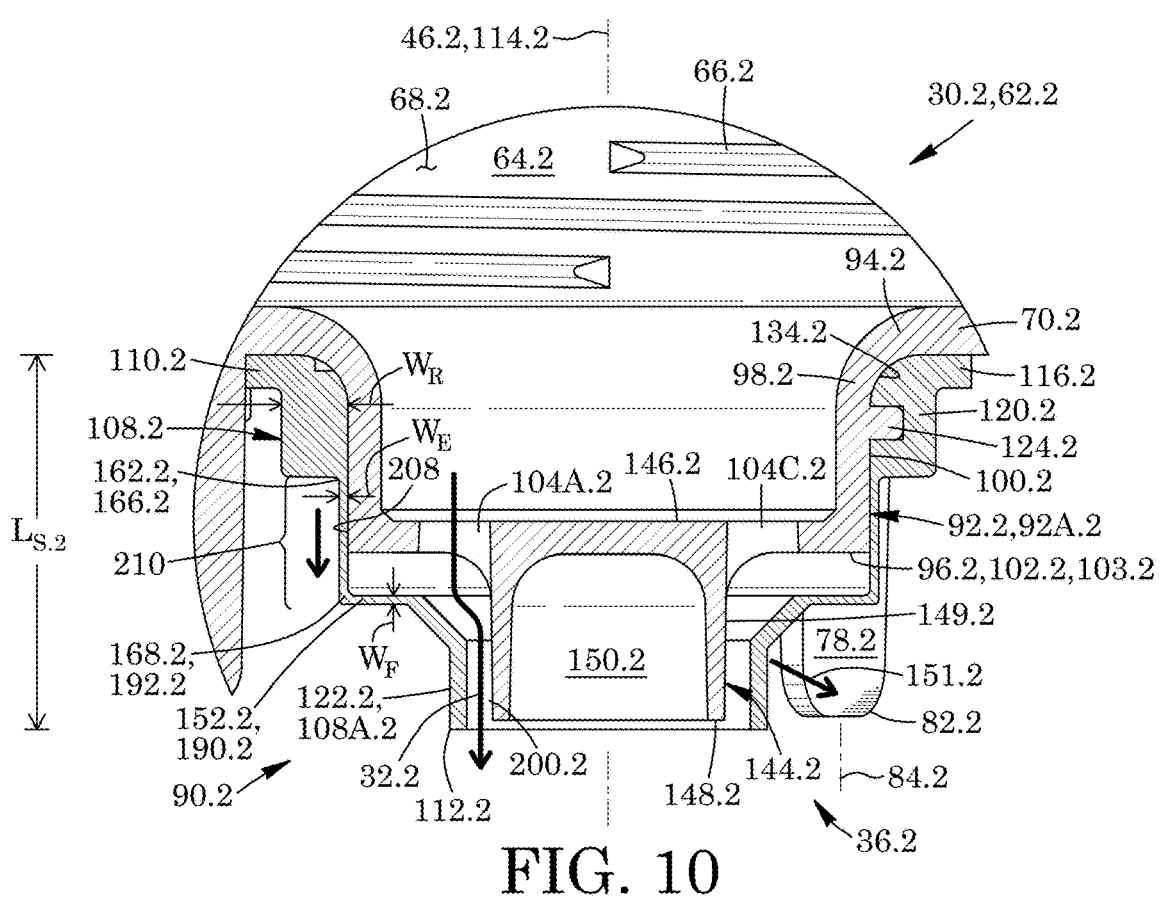
FIG. 10 is a sectional view of the dispenser apparatus and valve assembly of FIG. 9 shown in fragment, with the valve assembly being shown in an actuated position so as to enable foodstuff from the dispenser apparatus to pass therethrough.

FIGS. 9 to 10 shows a dispenser apparatus 30.2 according to a further aspect. Like parts have like numbers and functions as dispenser apparatus 30.1 shown in FIGS. 4 to 8 with decimal extension "0.2" replacing decimal extension "0.1" and being added for parts not previously having a decimal extension. Dispenser apparatus 30.2 is substantially the same as dispenser apparatus 30.1 shown in FIGS. 4 to 8 with at least the following exceptions.

Referring to FIG. 9, outer valve member 108.2 (and/or valve 108A.2 thereof) is shaped to include one or more slack portions that selectively enable distal end portion 122.2 thereof to extend radially and axially outward from distal end 148.2 of protrusion 144.2 upon actuation of valve assembly 90.2. The following is a non-limiting embodiment which achieves this functionality.

Valve 108A.2 is corrugated at least in part in this non-limiting embodiment. The valve includes a plurality of annular folds 202, 204 and 206 in this example in the non-actuated state thereof. First tubular portion 120.2 of the valve is folded at least in part. The first tubular portion of valve 108A.2 comprises folds 202, 204 and 206. First tubular portion 120.2 of the valve is corrugated in this embodiment. Valve 108A.2 is so formed during the molding thereof or folded in the longitudinal direction during the manufacturing process thereof such that the folds 202, 204 and 206 overlap one another so as to align parallel to longitudinal axis 114.2 of valve 108A.2. The folds are substantially longitudinally-extending in this embodiment, substantially extending parallel to and/or coaxial with longitudinal axis 46.2 of dispenser apparatus 30.2. Folds 202, 204 and 206 extend axially in part and radially-inwards in part. The folds extend along and about outer surface 100.2 of nozzle 92A.2 in this example in the non-actuated state of valve 108A.2. First tubular portion 120.2 so shaped, or folds 202, 204 and 206 thereof, function to promote or cause second flange 190.2 of the valve to abut against end member 102.2 of nozzle 92A.2. The second flange abuts the end member of the nozzle adjacent outer surface 100.2 along outer periphery 103.2 so as to form a first compression seal 152.2.

As seen in FIG. 10 and in this non-limiting embodiment, first tubular portion 120.2 of valve 108A.2 adjacent flange portion 116.2, has enlarged wall thickness $W_E$ of the valve relative to that of the rest of the valve. Wall thickness $W_R$ of the first tubular portion of valve 108A.2 comprising folds 202, 204 and 206 is reduced and thinner compared to wall thickness $W_E$. Wall thickness $W_F$ of second flange 190.2 is reduced and thinner in this example and in this non-limiting embodiment. Wall thickness $W_F$ is substantially similar to or equal to wall thickness $W_E$ in this example. However, this is not strictly required. Wall thickness $W_F$ in this example is less than that of tubular portion 174.2 and distal end portion 122.2 of valve 108A.2 in this non-limiting embodiment.

The folds and/or the extent of folding thereof is reduced or eliminated upon valve assembly 90.2 being actuated as seen in FIG. 10. First tubular portion 120.2 is shaped to extend along and abut against outer surface 100.2 of nozzle 92A.2 so as to promote a second compression seal 208 when the valve assembly is actuated. The second compression seal may function to inhibit foodstuff exiting apertures 104A.2 and 104C.2 from entering into or adjacent folds 202, 204 and 206 when valve 108A.2 returns to its non-actuated state once more as seen in FIG. 9. Referring back to FIG. 10, actuation of valve assembly 109.2 causes second flange 190.2 of valve 108A.2 to be axially spaced from end member 102.2 of nozzle 92A.2 and apertures 104A.2 and 104C.2. Actuation of the valve assembly causes valve 108A.2 to unfold at least in part, with tubular portion 174.2 and distal end portion 122.2 of the valve moving axially and radially outwards (as seen by arrow 151.2) so as to form annular passageway 200.2 via which foodstuff 32.2 exits dispenser apparatus 30.2.

Valve 108A.2 may thus be said to include in this example a region 210 of reduced wall thickness (lower part of first tubular portion 120.2 and second flange 190.2) that is annular and L-shaped in lateral section when valve assembly 109.2 is actuated.

Figure 11:
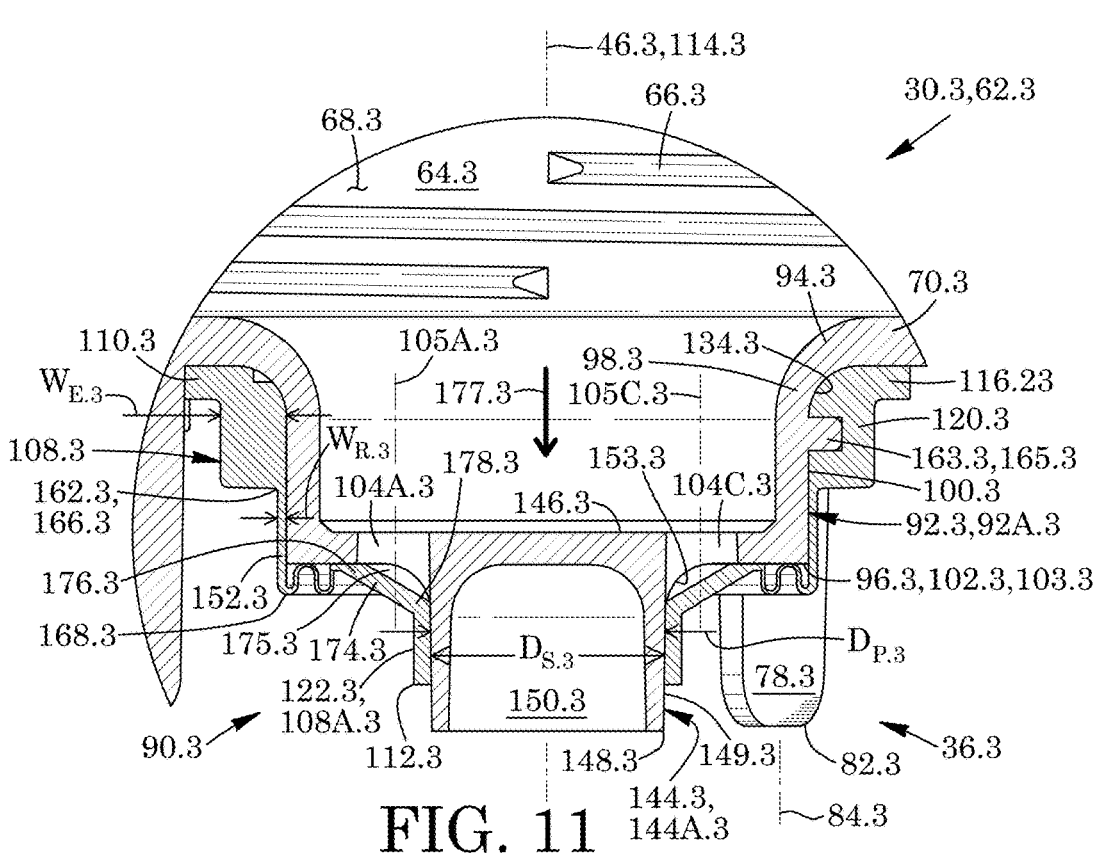
FIG. 11 is a sectional view of a dispenser apparatus with a valve assembly according to yet another aspect, the dispenser apparatus being shown in fragment, the valve assembly including a nozzle having axially-extending apertures and including a protrusion axially extending therefrom, the valve assembly including a valve laterally-folded in part and extending about the nozzle and protrusion, and with the valve assembly shown in a non-actuated position.
Figure 12:
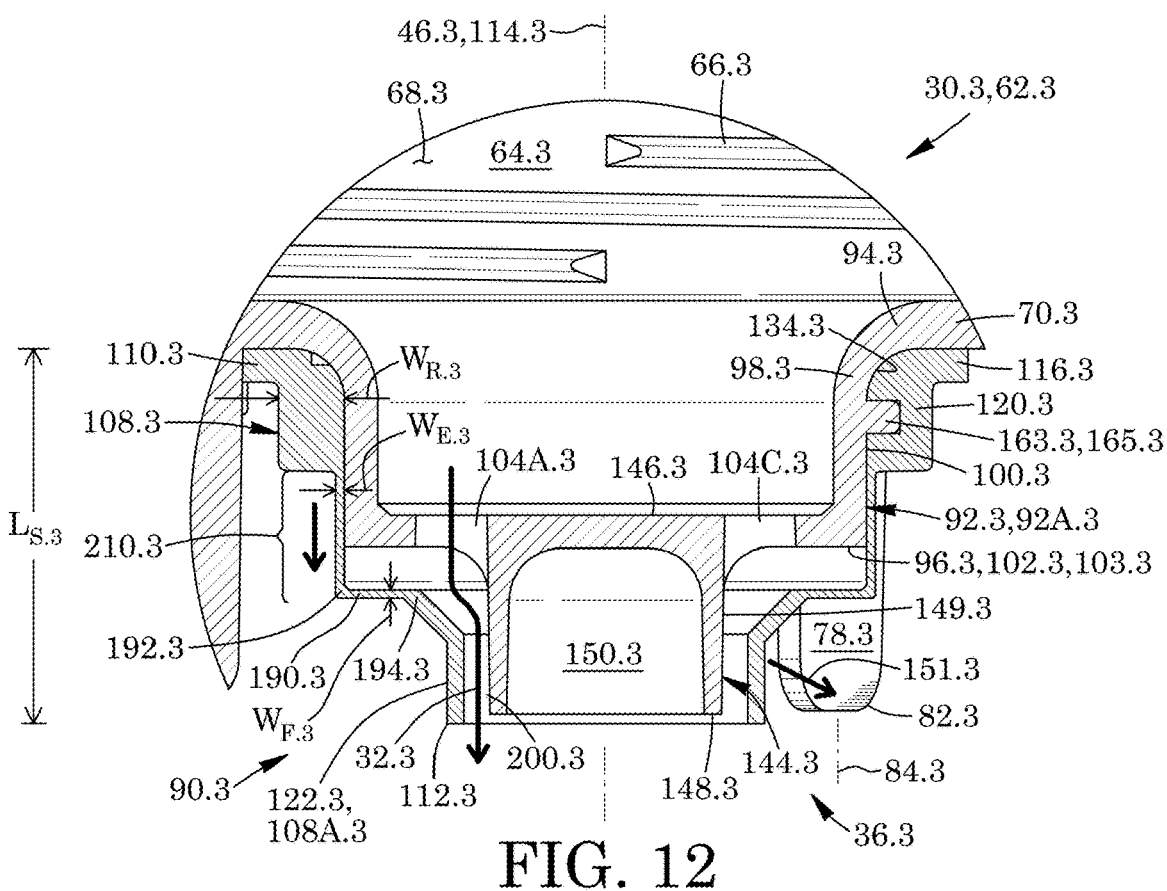
FIG. 12 is a sectional view of the dispenser apparatus and valve assembly of FIG. 11 shown in fragment, with the valve assembly being shown in an actuated position so as to enable foodstuff from the dispenser apparatus to pass therethrough.

FIGS. 11 to 12 shows a dispenser apparatus 30.3 according to a yet another aspect. Like parts have like numbers and functions as dispenser apparatus 30.2 shown in FIGS. 9 to 10 with decimal extension "0.3" replacing decimal extension "0.2" and being added for parts not previously having a decimal extension. Dispenser apparatus 30.3 is substantially the same as dispenser apparatus 30.2 shown in FIGS. 9 to 10 with at least the following exceptions.

As seen in FIG. 11, annular folds 202.3, 204.3 and 206.3 of outer valve member 108.3 (and/or valve 108A.3 thereof) are substantially laterally-extending in this embodiment, substantially perpendicular to longitudinal axis 46.3 of dispenser apparatus 30.3 in this example. Valve 108A.3 is so formed by molding or folded in the lateral direction in the manufacturing process thereof, such that the folds overlap one another so as to align perpendicular to longitudinal axis 114.3 of the valve. Folds 202.3, 204.3 and 206.3 extend axially in part and radially-inwards in part. Second flange 190.3 of valve 108A.3 is folded at least in part and comprises the folds in this example. Folds 202.3, 204.3 and 206.3 of valve 108A.3 extend along distal end 96.3 and end member 102.3 of nozzle 92A.3 from outer periphery 103.3 towards longitudinal axis 114.3 of the valve.

FIGS. 13 to 17 show a dispenser apparatus 30.4 according to a yet an additional aspect. Like parts have like numbers and functions as dispenser apparatus 30.1 shown in FIGS. 4 to 8 with decimal extension "0.4" replacing decimal extension "0.1" and being added for parts not previously having a decimal extension. Dispenser apparatus 30.4 is substantially the same as dispenser apparatus 30.1 shown in FIGS. 4 to 8 with at least the following exceptions.

Dispenser lid 62.4 in this non-limiting embodiment comprises a single base member formed by a plurality of base member portions 74.4, 76.4 and 78.4 with a plurality of recessed portions 75.4, 77.4 and 79.4 therebetween; however, this is not strictly required. The distance between proximal and distal ends 80.4 and 82.4 of the base member portions in this non-limiting example varies in this example, with the base member being wave-shaped and/or concave in part and convex in part in side profile adjacent the proximal ends thereof.

Figure 16:
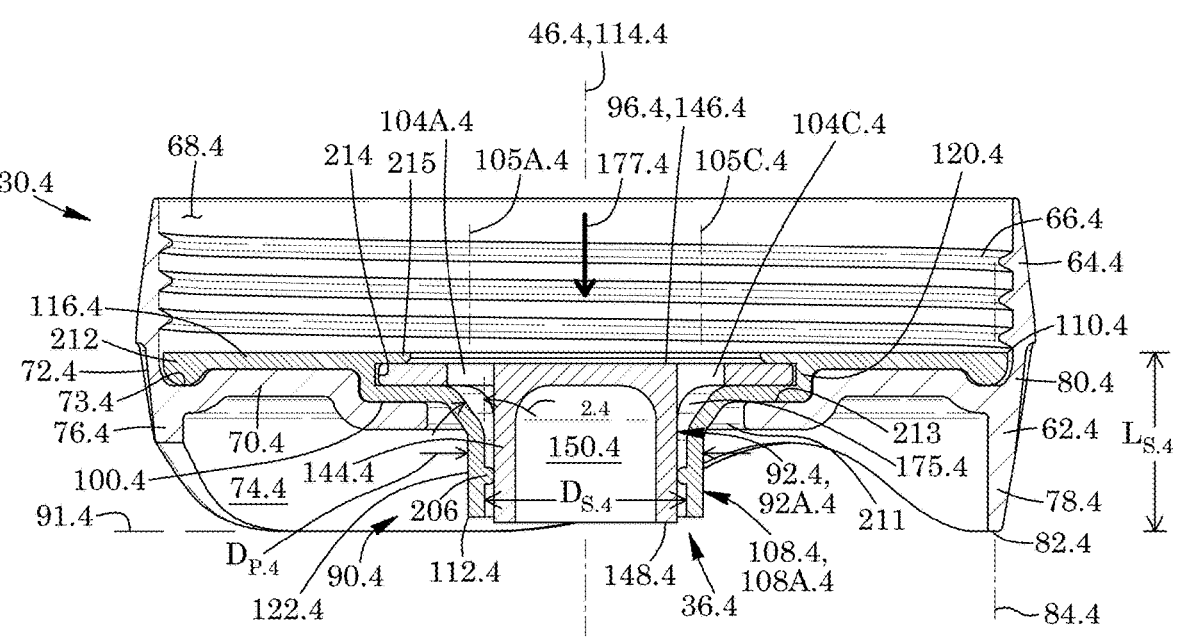
FIG. 16 is a sectional view of the dispenser apparatus of FIG. 13, the dispenser apparatus being shown in fragment, the valve assembly being shown in a non-actuated position.

Referring to FIG. 16, dispenser lid 62.4 is configured to support inner valve member 92.4 and/or inhibit outer valve member 108.4 from sagging under head pressure. The following is a non-limiting embodiment that achieves this functionality. Planar member 70.4 of dispenser lid 62.4 has a centrally-positioned aperture 211 extending therethrough and which aligns with axes 46.4 and 114.4. The dispenser lid has an annular recessed region or seat 213 coupled to and extending radially inwards and axially outwards/downwards from planer member 70.4 thereof.

Figures 15A, 15B:
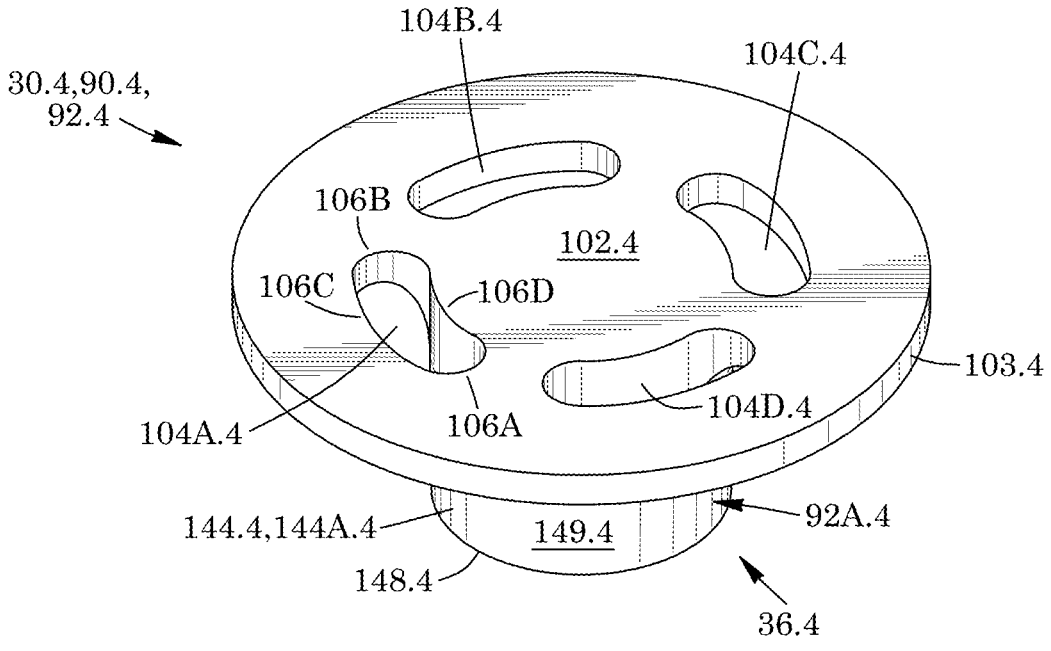
FIG. 15A is a top, side perspective view of an inner valve member of the valve assembly of FIG. 13.
FIG. 15B is a bottom, side perspective view thereof.

As seen in FIGS. 15A and 15B, inner valve member 92.4 is configured to be selectively removable from the dispenser lid for cleaning and the like and may be referred to as an insert. The inner valve member in this embodiment comprises i) protrusion 144.4 without a nozzle or tubular member through which foodstuff passes and ii) an end member, in this non-limiting example a flange 102.4 coupled and radially-extending outwards from the protrusion. In addition or alternatively, inner valve member 92.4 may comprise and/or be referred to as a center diffusion nozzle. Protrusion 144.4 couples to and extends axially outwards from flange 102.4. The flange and protrusion are integrally connected so as to form a unitary whole in this non-limiting embodiment.

Referring to FIG. 15B, the geometry of protrusion 144.4 may be changed for different manufacturing methods. For example, where outer valve member 108.4 is machined, there may be no center blind hole within the protrusion. Outer diameter $D_{P.4}$ of protrusion 144.4 may be varied depending on the tendency for a foodstuff such as a sauce to create a meniscus. For a protrusion which is round or cylindrical in outer shape, a larger diameter (such as ~¾ inches in one non-limiting example) may function to inhibit formation/remaining of a meniscus after valve 108A.4 closes. The geometry of protrusion 144.4 may thus be changed/altered/varied in conjunction with outer valve member 108.4 to create different stream shapes (e.g. thin stream, wide thin stream etc.) and inhibit the formation of a meniscus.

Axially-extending and circumferentially spaced-apart apertures 104A.4, 104B.4, 104C.4 and 104D.4 extend through flange 102.4 and about protrusion 144.4. The apertures are positioned adjacent proximal end 146.4 and outer surface 149.4 of the protrusion in this example. The apertures are sized to enable/promote maximum and even flow. The number, shape and location of apertures 104A.4, 104B.4, 104C.4 and 104D.4 can be varied depending on nozzle 92.4. Each apertures is arcuate or arc shaped in this non-limiting example. Flange 102.4 for each aperture 104A.4 includes a pair of outwardly-concave portions 106A and 106B which face each other and a pair of elongate and in this example curved connection portions 106C and 106D extending between the outwardly-concave portions in this non-limiting example. Connecting portion 106C is outwardly concave, connecting portion 106D is outwardly convex in this non-limiting example. Connecting portion 106C is radially outwardly spaced relative to connecting portion 106D in this non-limiting embodiment.

As seen in FIG. 15B, flange 102.4 transitions to protrusion 144.4 via one or more and in this non-limiting example a plurality of fillets 153A.4, 153B.4, 153C.4 and 153D.4 positioned between respective apertures 104A.4, 104B.4, 104C.4 and 104D.4.

Figure 13:
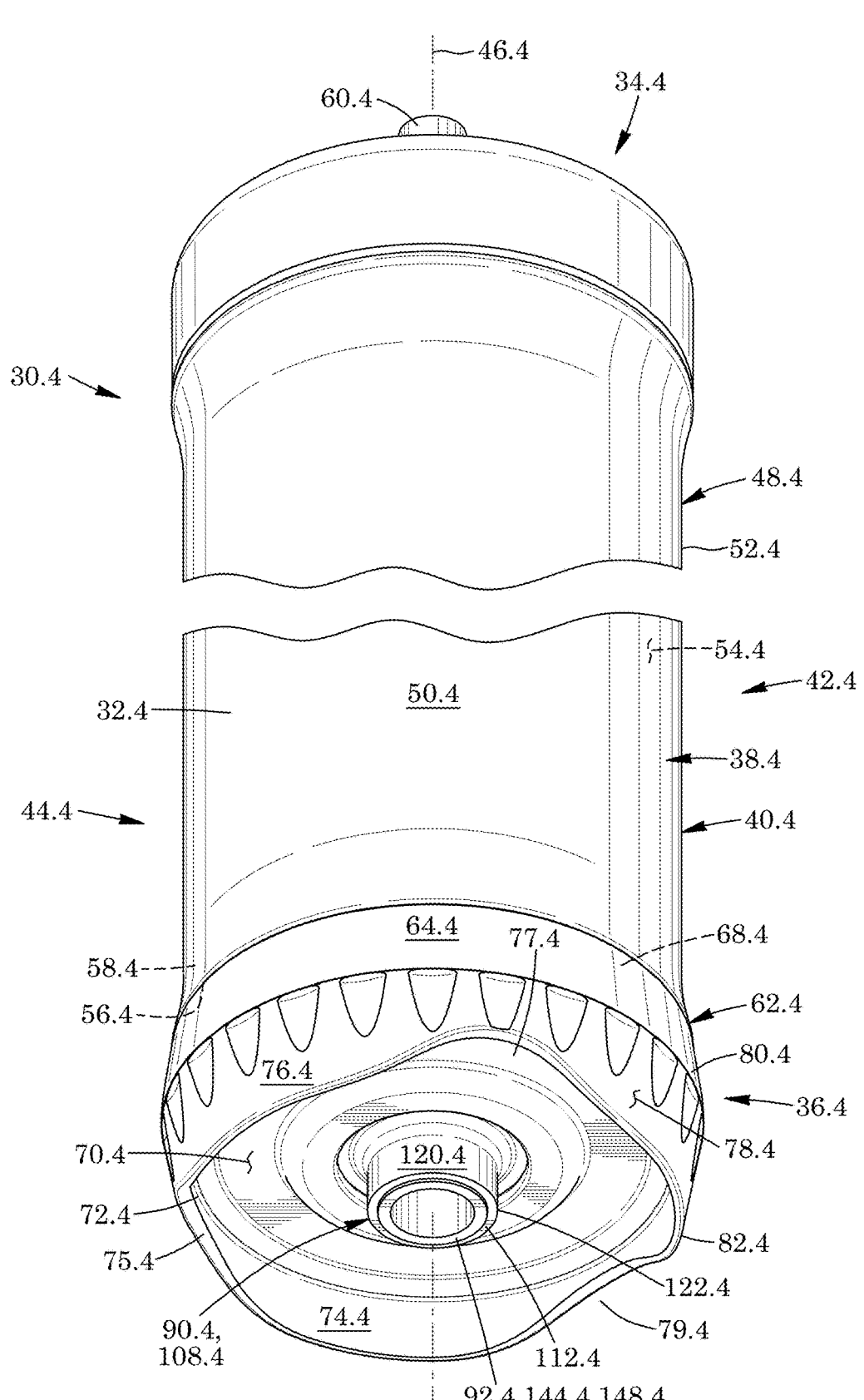
FIG. 13 is a bottom, front perspective view of a dispenser apparatus according to yet an additional aspect, the dispenser apparatus including a dispenser lid and a valve assembly.
Figure 14A:
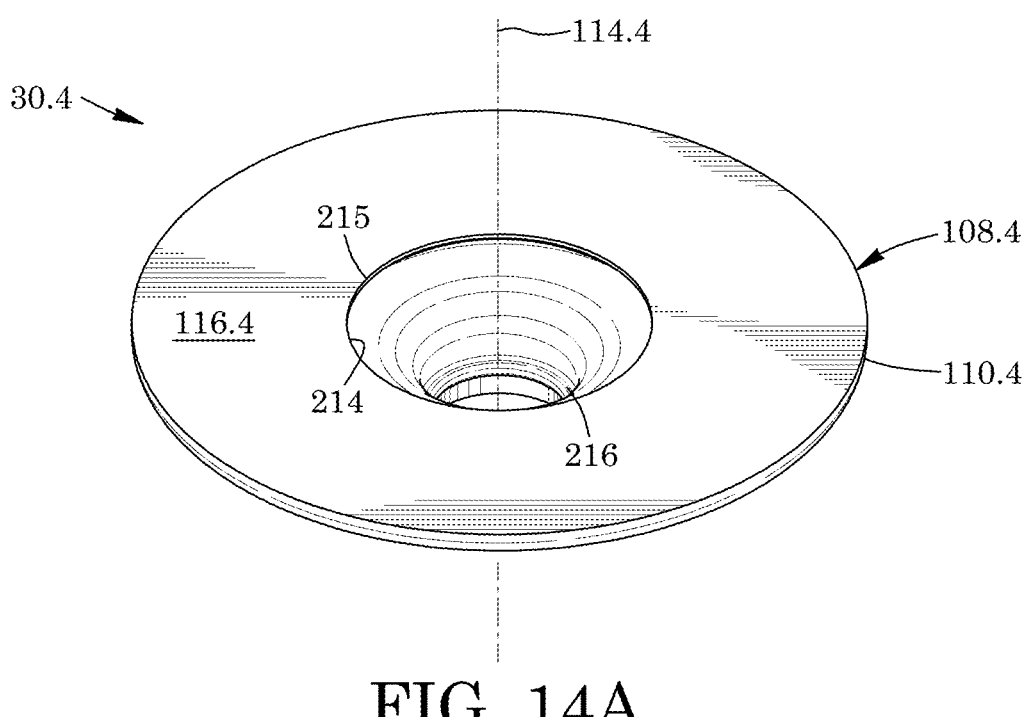
FIG. 14A is a top, side perspective view of an outer valve member of the valve assembly of FIG. 13.
Figure 14B:
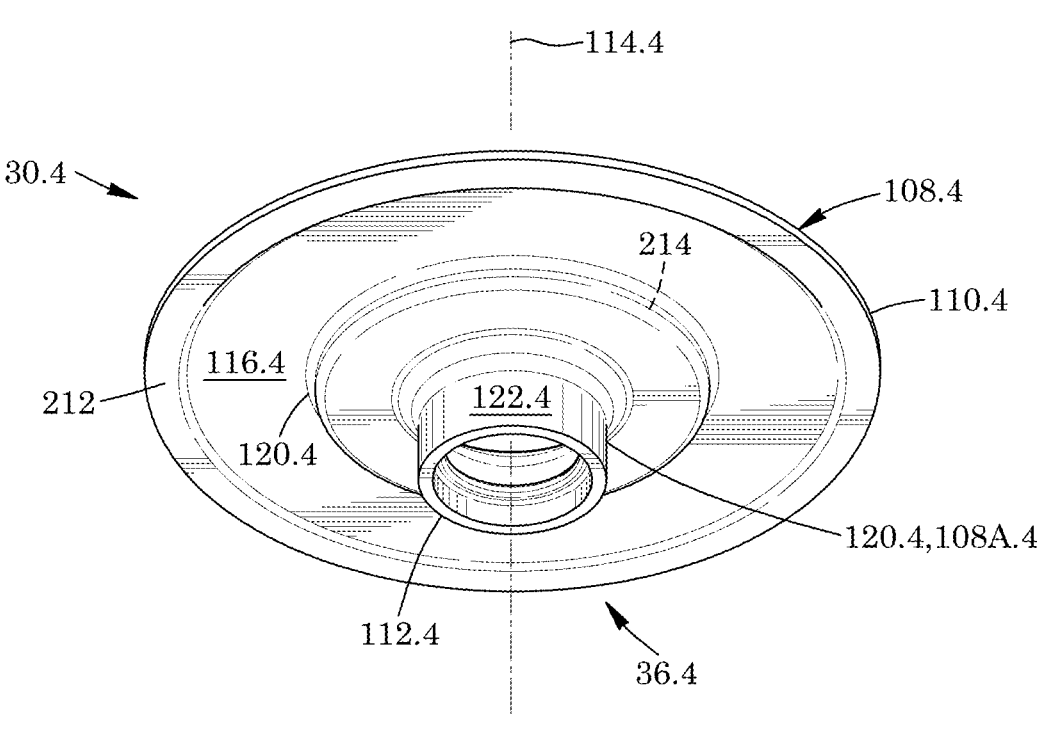
FIG. 14B is a bottom, side perspective view thereof.

As seen in FIG. 16, outer valve member 108.4 includes an annular protuberance or seal 212 coupled to and extending about radially outwardly-extending flange 116.4 thereof. The seal is integrally connected to the flange in this example so as to form a unitary whole. Seal 212 is shaped to mate with and/or fit within groove 73.4. The seal in this example is outwardly convex and the groove of the dispenser lid is outwardly concave in a top-facing direction in this non-limiting embodiment; however, this is not strictly required. Seal 212 is configured to inhibit foodstuff from passing therethrough and between flange 116.4 and planar member 70.4 of dispenser lid 62.4. A valve/dispenser-apparatus interface is thereby formed when dispenser apparatus 30.4 seen in FIG. 13 is threadably coupled to the dispenser lid so as to abut seal 212 seen in FIG. 16. This creates a watertight seal, which may also be airtight in one non-limiting embodiment. The percent of compression of the seal of outer valve member 108.4 may be up to 20% in one non-limiting example. The compression may be controlled by a feature (not shown) on the dispenser apparatus that stops or inhibits further axial movement of the dispenser lid relative to the dispenser when it is screwed on. Limiting the compression prevents outer valve member 108.4 from twisting and potentially deforming when the whole assembly is screwed together. This also controls the compression set ensuring there is always a seal. The percent of compression and geometry of the seal can be adjusted with the material and durometer of outer valve member 108.4.

Still referring to FIG. 16, outer valve member 108.4 is shaped to couple with inner valve member 92 in this example via male and female members: in this non-limiting example flange 116.4 includes an axially inwardly-facing, annular recessed portion 214 shaped to receive periphery 103.4 of flange 102.4. The recessed portion comprises and/or is formed by a pair of annular and axially spaced portions, in this example flange 190.4 and flap 215 thereabove. Recessed portion 214 is C-shaped in lateral section in this example and is shaped to snugly receive and enclose the periphery of the flange of the inner valve member. There is a slight interference fit (e.g. ~2%) between flange 116.4. and recessed portion 214 of outer valve member 108.4 to help secure the flange in place after assembly. A plunger (not shown nor necessarily required) may extrude the foodstuff through valve assembly 90.4 and if the plunger is pulled back a vacuum is created which has the potential to dislodge inner valve member 92.4 and this interference along with flap 215 hold flange 102.4 and thus inner valve member 92.4 in place. The flap along with the extent of interference fit connection described above can be changed as required to increase or decrease the hold on the inner valve member depending on the type of dispensing apparatus 30.4 seen in FIG. 13, type of foodstuff (e.g. sauce viscosity etc.) and the like.

Seat 213 of dispenser lid 62.4 is shaped to receive and support thereon recessed portion 214 of outer valve member 108.4. The dispenser lid so shaped may facilitate regulation of the expansion of the valve.

Protrusion 144.4 extends axially downwards from the perspective of FIG. 16, thereby creating a wall around valve 108A.4 which follows the valve profile up to and/or past distal end 112.4 of the valve. The angled section geometry of tubular portion 174.4 of valve 108A.4 may be varied to change the actuation pressure requirements i.e. more or less head acting on the sealing areas of valve 108A.1.

Figure 17:
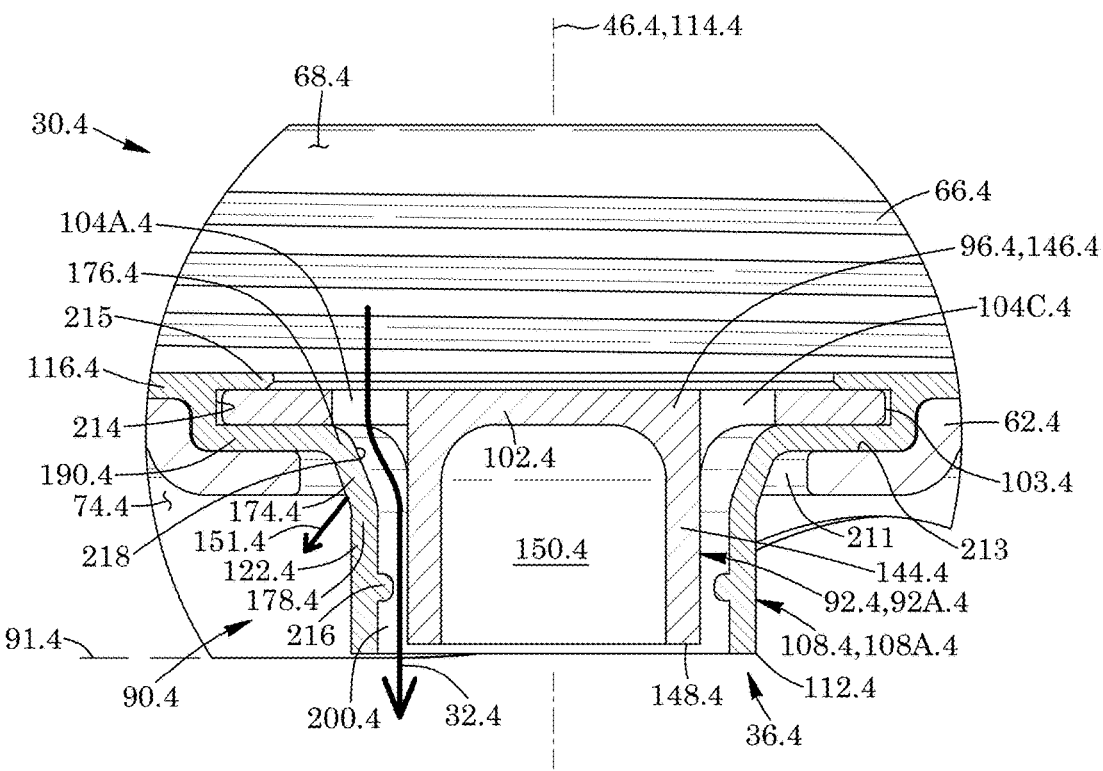
FIG. 17 is a sectional view thereof, with the valve assembly being shown in an actuated position so as to enable foodstuff from the dispenser apparatus to pass therethrough.

Still referring to FIG. 16, valve assembly 90.4 includes a sealing ring 216 interposed between and coupling to one of distal end portion 122.4 of valve 108A.4 of outer valve member 108.4 and protrusion 144.4 of inner valve member 92.4: in this example the sealing ring couples to the valve. The outer valve member may thus be said to include a radially inwardly-extending annular portion which extends about and selectively abuts the protrusion. Sealing ring 216 may be referred to as a valve sealing ring and in this non-limiting example integrally connects to distal end portion 122.4 of valve 108A.4 so as to form a unitary whole. Referring to FIG. 17, the valve inlet and/or inwardly-facing area or surface 218 of tubular portion 174.4 may act to change (reduce or increase) the head pressure on sealing ring 216 and to help hold valve 108A.4 in place.

The shape, number of features and interference of sealing ring 216 help to determine the required actuation pressure and control (along with tubular portions 174.4 and 122.4 of valve 108A.4) the flow rate during the sauce extrusion. A single ring between 8-20% interference in one non-limiting example was found to be a good balance between dispensing effort, leak prevention, maximizing cleanability and dispensing velocity.

When valve assembly 90.4 is actuated as seen in FIG. 17, the distal end portion and sealing ring of the valve are configured to expand radially outwards in part and axially outwards/downwards in part so as to selectively enable foodstuff 32.4 to pass therethrough. As valve 108A.4 is actuated there is thus both radial and axial movement. If there is a gap between the valve and protrusion 144.4 then the head pressure acts on the valve both radially and axially. This affect in its extreme may not desirable if sealing ring 216 shifts down to the point where foodstuff can leak; however, in alternate designs some shifting axially downwards (shifting back upwards thereafter) may be beneficial. The amount interference between protrusion 144.4 and valve inlet and/or outer valve member 108.4 changes the pressure required to open valve 108.4 (the more interference the more pressure required to dispense). An interference fit in the non-limiting range of 8-20% was found to be a good balance between dispensing effort, leak prevention and dispensing velocity.

Distal end portion 122.4 of valve 108A.4 is configured to minimize the occurrence of meniscus formation when dispensing viscous sauces and shapes the output sauce stream. This may be facilitated/adjusted by varying geometry of the valve and/or the extent of the interference fit of the valve (and/or distal end portion thereof) with protrusion 144.4.

It will be appreciated that many variations are possible within the scope of the invention described herein.

Many advantages result from the structure of the present invention. High level dispensing low viscosity sauces (oil, water etc.) present leaking issues for common valve/dispensing technologies found in commercial kitchens (e.g. squeeze bottles, portion-controlled canisters etc.). Typically a valve is located on the sauce side of a dispensing dispenser lid. The valve may be cut to allow/regulate the flow and the geometry/material will help to stop the flow. Typically squeeze bottles will be stored valve side up or use a precision tip (a conical tip with an open hole) dispenser lid to mitigate the leaking issue. Typically, valves leak in the following ways:

a. After use (especially if the dispenser is kept in a warm environment) due to the cut pattern not stopping the flow.

b. If the dispensing device is placed on a surface hard/fast c. If the dispensing device is stored at a low temperature and then exposed to room temperature air pockets expand and extrude sauce d. During/after make-up air (i.e. When a squeeze bottle is used the contents are extruded out. The bottle is deformed in the process. The natural spring back of the bottle returns the bottle to round. During the rebound process air is sucked (make-up air) through the valve and can allow leakage).

e. Particles get stuck and hold open the valve flaps.

f. The flaps are made by a post process cut. The ends of the cut are prone to ripping.

Valve assemblies 90/90.1/90.2/90.3/90.4 as herein described may function to overcome one or more of the above disadvantages.

For example, valve 108A/108A.1/108A.2/108A.3/108A.4 may be formed without cutting required during the production thereof. The valves as herein described may thus be less prone to ripping and/or may thus be shaped for a more prolonged life/time-of-operation. Thus no secondary cutting process is used and this therefore mitigates the tearing seen in cut valves commonly seen as industry standard.

Valve assemblies 90/90.1/90.2/90.3/90.4 as herein described may facilitate selective dispensing of foodstuff in a manner that inhibits and/or which provides a relatively low downward velocity thereof. The valve assemblies so shaped and configured may function to redirect and retard pressures/forces, thereby resulting in a valve 108A/108A.1/108A.2/108A.3/108A.4 that is inhibited from squirting foodstuff with high velocity.

Valve assemblies 90/90.1/90.2/90.3/90.4 are shaped to promote a full shut-off of foodstuff with the closing of elastomeric valve 108A/108A.1/108A.2/108A.3 when not actuated, even when dispenser apparatus 30/30.1/30.2/30.3/30.4 is hit on a counter, for example.

Valve assemblies 109/109.1/109.2/109.3/109A.4, with its nozzle 92A/92A.1/92A.2/92A.3 and/or protrusion 144/144.2/144.3/144.4 so shaped and elongated, may function accommodate particulate/foodstuff and still selectively shut off flow due to compression of valve 108A/108A.1/108A.2/108A.3/108A.4.

Valve assemblies 90/90.1/90.2/90.3/90.4 as herein described may be used on portion-controlled devices.

Bottom or end member 102/102.1/102.2/102.3/102.4 and/or distal end 148/148.1/148.2/148.3/148.4 of protrusion 144/144.2/144.3/144.4 so shaped may function to inhibit residual dripping of foodstuff.

Dispenser lid 62/62.1/62.2/62.3/62.4 and valve 108A/108A.1/108A.2/108A.3/108A.4 are designed to be removable to facilitate and enhance cleanability.

The lower or distal end portion 122/122.1/122.2/122.3/122.4 of valve 108A/108A.1/108A.2/108A.3/108A.4 so shaped and having an interference fit (8-12%) with nozzle 92A and/or protrusion 144/144.1/144.2/144.3/144.4 thereof, may function to promote creating a 100% mechanical seal. At rest the seal may prevent leakage both passively and accidental (e.g. hitting on a counter) and backflow into dispenser apparatus 30/30.1/30.2/30.3/30.4.

The length of dispenser lid engagement and local thickness of valve 108A/108A.1/108A.2/108A.3/108A.4 is optimized to minimize required opening pressure, as well optimized for ease of assembly and durability, allowing thin to viscous liquids to be dispensed (e.g. oil/water to ketchup/mayonnaise based sauces).

Each of valve assemblies 90/90.1/90.2/90.3/90.4 as herein described may be individually or collectively referred to as valve means for selectively enabling foodstuff 32/32.1/32.2/32.3/32.4 to exit from dispenser apparatus 30/30.1/30.2/30.3/30.4.

Where a component (e.g. a member, apparatus, assembly, device etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

ADDITIONAL DESCRIPTION

Examples of valve assembly for dispensing foodstuff, as well as dispenser apparatuses and lids comprising the same, have been described. The following clauses are offered as further description.

(1) A valve assembly for dispensing foodstuff, the valve assembly comprising: an elongate conduit having a closed end, an outer surface and one or more radially-extending apertures extending therethrough; and a tubular resilient member shaped to extend about, parallel to and axially outwards from the outer surface of the conduit.

(2) A valve assembly for dispensing foodstuff, the valve assembly comprising: an elongate conduit having a closed end, an outer surface and one or more radially-extending apertures extending therethrough; a tubular resilient member shaped to extend about the conduit; and one or more stops extending radially from one of the conduit and the tubular resilient member, the one or more stops being shaped to inhibit movement of the tubular resilient member relative to the conduit both axially and circumferentially.

(3) A valve assembly according to any clause herein, wherein the one or more stops couple to the conduit.

(4) A valve assembly according to any clause herein, wherein the one or more stops are integrally connected to the conduit so as to form a unitary whole.

(5) A valve assembly according to any clause herein, wherein the conduit has an open proximal end and a closed distal end, with the one or more radially-extending apertures of the conduit being positioned between the ends thereof.

(6) A valve assembly according to any clause herein, wherein the tubular resilient member includes a tubular portion having a substantially constant diameter.

(7) A valve assembly according to clause 6 or any clause herein, wherein the tubular resilient member includes a flange portion coupled to and extending radially outwards from the tubular portion thereof.

(8) A valve assembly according to any clause herein, wherein the tubular resilient member includes one or more recesses shaped to mate with respective said one or more stops.

(9) A valve assembly according to any clause herein, wherein each said stop is triangular in lateral section.

(10) A valve assembly according to any clause herein, wherein each said stop is wedge-shaped at least in part.

(11) A valve assembly according to any clause herein, wherein each said stop is arc-shaped at least in part.

(12) A valve assembly according to any clause herein, wherein each said stop is annular at least in part.

(13) A valve assembly according to any clause herein, wherein each said stop is a triangular prism at least in part.

(14) A valve assembly according to any clause herein, wherein said stops are circumferentially space-apart about the conduit.

(15) A valve assembly according to any clause herein, wherein each said stop aligns with a respective said radially-extending aperture.

(16) A valve assembly according to any clause herein, wherein each said stop is shaped to constrain movement of the tubular resilient member in three orthogonal directions.

(17) A valve assembly according to any clause herein, wherein each said stop has a planar surface facing the proximal end of the conduit.

(18) A valve assembly according to any clause herein, wherein each said stop has one or more planar surfaces extending between the proximal end and the distal end of the conduit.

(19) A valve assembly according to any clause herein, wherein each said stop tapers in a direction extending from the proximal end to the distal end of the conduit

(20) A valve assembly according to any clause herein, wherein the one or more recesses of the tubular resilient member are triangular in lateral section.

(21) A valve assembly according to any clause herein, wherein the one or more recesses of the tubular resilient member are arc-shaped at least in part.

(22) A valve assembly according to any clause herein, wherein the one or more recesses of the tubular resilient member are annular at least in part.

(23) A valve assembly according to any clause herein, wherein the one or more recesses of the tubular resilient member are radially inwardly-facing.

(24) A valve assembly according to any clause herein, wherein the one or more recesses of the tubular resilient member are circumferentially spaced-apart.

(25) A valve assembly according to any clause herein, wherein the one or more radially-extending recesses of the conduit are positioned adjacent the closed distal end of the conduit.

(26) A valve assembly according to any clause herein, wherein the one or more radially-extending apertures of the conduit are axially spaced from the one or more stops.

(27) A valve assembly for dispensing foodstuff, the valve assembly comprising: an elongate conduit having a closed end and one or more radially-extending apertures extending therethrough; a tubular resilient member shaped to extend about the conduit; and one or more stops extending between the conduit and the tubular resilient member, the one or more stops being wedge-shaped at least in part.

(28) A valve assembly according to any clause herein, wherein the one or more stops couple to and extend radially outwards from the conduit.

(29) A valve assembly according to any clause herein, wherein the conduit is cylindrical in outer shape.

(30) A valve assembly according to any clause herein, wherein the tubular resilient member is configured to enclose the one or more radially-extending apertures.

(31) A valve assembly according to any clause herein, wherein the tubular resilient member is configured to inhibit foodstuff from passing through the conduit via the one or more apertures until pressure within the conduit exceeds a predetermined threshold.

(32) A valve assembly according to any clause herein, wherein the tubular resilient member is configured to extend substantially vertically when in use.

(33) A valve assembly according to any clause herein, wherein the tubular portion of the tubular resilient member is configured to extend substantially vertically when in use.

(34) A valve assembly according to any clause herein, wherein the conduit and the tubular resilient member are configured to inhibit one or more spaces therebetween.

(35) A valve assembly according to any clause herein, wherein the tubular resilient member is configured to selectively expand resiliently outwards upon pressure within the conduit exceeding a predetermined threshold.

(36) A dispenser apparatus comprising: an enclosure shaped to receive foodstuff therewithin; and a valve assembly of any clause herein, with the conduit of the valve assembly being in fluid communication with the enclosure.

(37) A dispenser apparatus according to any clause herein, including one or more base members extending about the valve assembly, with each said base member having a proximal end coupled to the enclosure and a distal end axially spaced from the proximal end thereof, and wherein the tubular resilient member has a distal end axially positioned between the distal ends of the conduit and the one or more base members.

(38) A dispenser apparatus according to any clause herein, including at least one base member having a proximal end coupled to the enclosure and a distal end axially spaced from the proximal end thereof, and wherein the tubular resilient member has a distal end radially and axially inwardly spaced from the distal ends of the at least one base member.

(39) A dispenser apparatus according to any clause herein, wherein the base members are circumferentially spaced between respective ones of said stops at least in part.

(40) A dispenser apparatus according to any clause herein, wherein the one or more stops are positioned adjacent the proximal end of the conduit.

(41) A valve assembly for dispensing foodstuff, the valve assembly comprising: an elongate conduit having a closed end and one or more radially-extending apertures extending therethrough; a tubular resilient member extending about the conduit; and one or more ledges coupled to and extending radially outwards from the conduit and upon which the tubular resilient member is suspended.

(42) A valve assembly according to any clause herein, wherein the tubular resilient member is suspended from the one or more ledges via an enlarged end portion thereof.

(43) A valve assembly according to any clause herein, wherein the tubular resilient member includes an outwardly axially hanging portion equal to or greater than a quarter than a total length of the tubular resilient member.

(44) A valve assembly according to any clause herein, wherein the tubular resilient member includes an outwardly axially hanging portion equal to or greater than a third than a total length of the tubular resilient member.

(45) A valve assembly according to any clause herein, wherein the axially hanging portion of the tubular resilient member is shaped to promote falling off or removal of foodstuff therefrom via gravity.

(46) A valve assembly according to any clause herein, wherein the tubular resilient member is resilient at least in part.

(47) A valve assembly according to any clause herein, wherein the conduit is rigid at least in part.

(48) A valve assembly according to any clause herein, wherein the tubular resilient member is more resilient than the conduit.

(49) A valve assembly according to any clause herein, wherein the tubular resilient member is an elastomer.

(50) A valve assembly according to any clause herein, wherein the conduit is in fluid communication with the foodstuff.

(51) A valve assembly for dispensing foodstuff, the valve assembly comprising: a first tube in communication with the foodstuff, the first tube being rigid, having a closed distal end and having one or more radially-extending apertures extending therethrough; and a second tube which is resilient, the second tube extending about and axially outwards from the first tube.

(52) A dispenser lid comprising the valve assembly of any clause herein.

(53) A dispenser lid of any clause herein, including a planar end to which the conduit couples and extends axially outwards therefrom.

(54) A dispenser lid of any clause herein, including a laterally-extending planar member to which the conduit couples and extends axially outwards therefrom, with the flange portion of the tubular resilient member being positioned between and abutting both the planar member and the one or more stops.

(55) A dispenser lid of any clause herein, including a laterally-extending planar member to which the conduit couples and extends axially outwards therefrom, with the planar member and the one or more stops being positioned to bias or compress the flange portion of the tubular resilient member therebetween.

(56) A valve assembly for dispensing foodstuff, the valve assembly comprising: an elongate conduit having a closed end and one or more axially-extending apertures extending therethrough; a protrusion coupled to and extending axially outwards from the conduit; and a tubular resilient member extending about the conduit, being shaped to inhibit foodstuff from exiting from the one or more apertures, and including a distal end portion which extends about the protrusion, the distal end portion of the tubular resilient member having a reduced wall thickness.

(57) A valve assembly of any clause herein, wherein the distal end portion has a wall thickness which is less than that of the rest of the tubular resilient member.

(58) A valve assembly according to any clause herein, wherein the distal end portion of the tubular resilient member axially aligns with the one or more apertures.

(59) A valve assembly for dispensing foodstuff, the valve assembly comprising: an elongate conduit having a closed end and one or more axially-extending apertures extending therethrough; a protrusion coupled to and extending axially outwards from the conduit; and a tubular resilient member extending about the conduit, being shaped to inhibit foodstuff from exiting from the one or more apertures, and including a distal end portion which extends about the protrusion, the distal end portion of the tubular resilient member axially aligning with the one or more apertures.

(60) A valve assembly according to any clause herein, wherein the distal end portion of the tubular resilient member extends parallel to and about the outer surface of the conduit so as to inhibit space therebetween.

(61) A valve assembly according to any clause herein, wherein the distal end portion of the tubular resilient member couples to the conduit via an interference fit and/or the distal end portion of the tubular resilient member couples to the protrusion via an interference fit.

(62) A valve assembly according to any clause herein, wherein the tubular resilient member is corrugated at least in part.

(63) A valve assembly for dispensing foodstuff, the valve assembly comprising: an elongate conduit having a closed end and one or more axially-extending apertures extending therethrough; a protrusion coupled to and extending axially outwards from the conduit; and a tubular resilient member extending about the conduit and being shaped to inhibit foodstuff from exiting from the one or more apertures, the tubular resilient member being corrugated at least in part.

(64) A valve assembly for dispensing foodstuff, the valve assembly comprising: an elongate conduit having a closed end and one or more axially-extending apertures extending therethrough; a protrusion coupled to and extending axially outwards from the conduit; and a tubular resilient member extending about the conduit and being shaped to inhibit foodstuff from exiting from the one or more apertures, the tubular resilient member including a plurality of annular folds.

(65) A valve assembly according to any clause herein, wherein the annular folds extend radially-inwards.

(66) A valve assembly according to any clause herein, wherein the annular folds extend along the closed end of the conduit.

(67) A valve assembly according to any clause herein, wherein the annular folds extend axially-inwards.

(68) A valve assembly according to any clause herein, wherein the annular folds extend along the outer surface of the conduit.

(69) A valve assembly according to any clause herein, wherein actuation of the valve assembly selectively enables foodstuff to exit from the one or more apertures and past the tubular resilient member.

(70) A valve assembly according to any clause herein, wherein valve assembly is actuated upon pressure within the conduit exceeding a predetermined threshold.

(71) A valve assembly according to any clause herein, wherein the number of annular folds and/or the extent of folding thereof is reduced upon the valve assembly being actuated.

(72) A valve assembly according to any clause herein, wherein actuation of the valve assembly causes the distal end portion of the tubular resilient member to extend radially and axially outwards from the distal end of the protrusion.

(73) A valve assembly according to any clause herein, wherein the tubular resilient member is shaped to include one or more slack portions which selectively enable the distal end portion of the tubular resilient member to extend radially and axially outwards from the distal end of the protrusion.

(74) A valve assembly according to any clause herein, wherein the tubular resilient member is a valve.

(75) A valve assembly for dispensing foodstuff, the valve assembly comprising: a valve comprising one or more circumferentially spaced-apart flanges, a first tubular portion coupled to and extending axially outwards from the one or more flanges, a second tubular portion coupled to and extending axially outwards and radially inwards from the first tubular portion, a third tubular portion coupled to and extending axially outwards and radially inwards from the second tubular portion, and a fourth tubular portion coupled to and extending axially outwards from the third tubular portion.

(76) A valve assembly according to any clause herein, including an elongate conduit having a closed end and a slanted distal shoulder, and wherein the second tubular portion is shaped to sealably abut the slanted distal shoulder.

(77) A valve assembly according to any clause herein, wherein the valve threadably couples to the conduit so as to promote a compression seal between the second tubular portion of the valve and the slanted distal shoulder of the conduit.

(78) A valve assembly according to any clause herein, wherein the conduit has one or more circumferentially spaced-apart apertures extending therethrough and wherein the third tubular portion is shaped to cover the one or more apertures.

(79) A valve assembly according to any clause herein, including a protrusion coupled to and extending axially outwards from the conduit, and wherein the fourth tubular portion is shaped to extend about the outer surface of the protrusion so as to inhibit space therebetween.

(80) A valve assembly according to any clause herein, wherein actuation of the valve assembly causes the third tubular portion to move axially outwards relative to the second tubular portion.

(81) A valve assembly according to any clause herein, wherein actuation of the valve assembly causes the third tubular portion to move radially outwards relative to the second tubular portion.

(82) A valve assembly according to any clause herein, wherein actuation of the valve assembly causes the third tubular portion to move towards a non-slanted position.

(83) A valve assembly according to any clause herein, wherein the valve includes one or more slack portions which selectively enable the fourth tubular portion to extend radially and axially outwards.

(84) A valve assembly for dispensing foodstuff, the valve assembly comprising: a valve comprising a radially-outwardly extending first flange, a first tubular portion coupled to and extending axially outwards from the first flange, the first tubular portion comprising one or more folds at least in a non-actuated state of the valve assembly, a second flange coupled to and extending radially inwards from the first tubular portion, a third tubular portion coupled to and extending axially outwards and radially inwards from the second flange, and a fourth tubular portion coupled to and extending axially outwards from the third tubular portion.

(85) A valve assembly according to any clause herein, including a conduit about which the valve extends, wherein the folds of the valve are shaped to promote a compression seal between the second flange and an end member of the conduit in a non-actuated state of the valve assembly.

(86) A valve assembly according to any clause herein, wherein the folds of the valve unfold so as to promote a compression seal between the first tubular portion and an outer surface of the conduit in an actuated state of the valve assembly.

(87) A valve assembly for dispensing foodstuff, the valve assembly comprising: a valve comprising a radially-outwardly extending first flange, a first tubular portion coupled to and extending axially outwards from the first flange, a second flange coupled to and extending radially inwards from the first tubular portion, the second flange comprising one or more folds at least in a non-actuated state of the valve assembly, a third tubular portion coupled to and extending axially outwards and radially inwards from the second flange, and a fourth tubular portion coupled to and extending axially outwards from the third tubular portion.

(88) A valve assembly according to any clause herein, wherein the valve is corrugated at least in part.

(89) A valve assembly according to any clause herein, wherein the first tubular portion is corrugated.

(90) A valve assembly according to any clause herein, wherein the first tubular portion is folded at least in part.

(91) A valve assembly according to any clause herein, wherein the first tubular portion comprises a plurality of annular folds.

(92) A valve assembly according to any clause herein, including one or more recessed regions between the second tubular portion and the third tubular portion.

(93) A valve assembly according to any clause herein, wherein the one or more recessed regions are annular.

(94) A valve assembly according to any clause herein, wherein the one or more recessed regions are triangular shaped in lateral section.

(95) A valve assembly according to any clause herein, wherein the one or more recessed regions are axially outwardly facing.

(96) A valve assembly according to any clause herein, wherein the one or more recessed regions align adjacent a proximal end of the third tubular portion.

(97) A valve assembly according to any clause herein, including a second flange extending radially between and coupling together the second tubular portion and the third tubular portion.

(98) A valve assembly according to any clause herein, wherein the second flange has said one or more recessed regions.

(99) A valve assembly according to any clause herein, wherein the second flange is shaped to promote outward pivoting of the third tubular portion relative to the second flange.

(100) A valve assembly according to any clause herein, wherein the second flange comprises a plurality of annular folds.

(101) A valve assembly according to any clause herein, wherein the second flange is folded at least in part.

(102) A valve assembly according to any clause herein, wherein the third tubular portion is made of a wall which tapers in a direction extending from the second tubular portion to the fourth tubular portion when the valve is actuated.

(103) A valve assembly according to any clause herein, wherein the fourth tubular portion has a wall thickness which is less than that of the first tubular portion, the second tubular portion and the third tubular portion.

(104) A valve assembly according to any clause herein, wherein the second tubular portion extends axially outwards at a first angle relative to the first tubular portion, wherein the third tubular portion extends axially inwards at a second angle relative to the fourth tubular portion, and wherein the first angle is substantially equal to the second angle.

(105) A valve assembly according to any clause herein, wherein the second tubular portion and the third each extend along a 45 degree slope.

(106) A valve assembly for dispensing foodstuff, the valve assembly comprising: an elongate conduit having a closed end and one or more axially-extending apertures extending therethrough; a protrusion coupled to and extending axially outwards from the conduit; and a tubular resilient member extending about the conduit and being shaped to inhibit foodstuff from exiting from the one or more apertures, the tubular resilient member having one or more recessed regions aligning with said one or more apertures.

(107) A valve assembly according to any clause herein, wherein actuation thereof causes the tubular resilient member to form an annular passageway which aligns with the one or more apertures.

(108) A valve assembly according to any clause herein, wherein the tubular resilient member is conical at least in part.

(109) A valve assembly according to any clause herein, wherein the conduit and/or the protrusion comprise a nozzle.

(110) A dispenser apparatus comprising: an enclosure shaped to receive foodstuff therewithin; a valve assembly of any clause herein; and one or more base members extending about the valve assembly, with each said base member having a proximal end coupled to the enclosure and a distal end axially spaced from the proximal end thereof, and with each said base member shaped to abut a respective one of the one or more flanges of the valve assembly.

(111) A dispenser apparatus according to any clause herein, wherein each said base member is shaped to inhibit rotational and axial movement of the valve assembly.

(112) A dispenser apparatus according to any clause herein, wherein each said base member is shaped to bias the tubular resilient member against the elongate protrusion.

(113) A dispenser apparatus according to any clause herein, wherein each said base member is forms a recessed region shaped to fit a respective said flange at least partially therein.

(114) A dispenser apparatus according to any clause herein, wherein each said base member includes a laterally-extending protuberance coupled thereto, with each said protuberance shaped to abut against in part against a respective said flange.

(115) A dispenser apparatus according to any clause herein, wherein the valve assembly is rotatable relative to the one or more base members from a first or uncoupled position, to a second or coupled position in which movement of the valve assembly relative to the base members is inhibited.

(116) A dispenser apparatus accordingly to any clause herein, wherein the inner valve member is selectively removable from the outer valve member.

(117) A dispenser apparatus accordingly to any clause herein, wherein the inner valve member comprises an insert.

(118) A valve assembly for dispensing foodstuff, the valve assembly comprising: a protrusion with a laterally-extending end member coupled thereto and with one or more apertures extending through or adjacent the end member thereof; and a tubular resilient member extending about and being configured to move both axially and radially outwards relative to the protrusion to selectively enable foodstuff to pass therethrough.

(119) A valve assembly according to any clause herein, including a sealing ring interposed between and coupling to one of the tubular resilient member and the protrusion.

(120) A valve assembly according to any clause herein, wherein the tubular resilient member includes a radially inwardly-extending annular portion which extends about and selectively abuts the protrusion.

(121) A valve assembly according to any clause herein, wherein the tubular resilient member is configured to inhibit foodstuff from passing therethrough until pressure acting thereon exceeds a predetermined threshold.

(122) A valve assembly according to any clause herein, wherein the tubular resilient member includes a distal end portion which extends about and is substantially parallel to the elongate protrusion.

(123) A valve assembly according to any clause herein, wherein the tubular resilient member extends about a longitudinal axis and includes a distal end portion which aligns in an axial direction with said one or more apertures.

(124) A valve assembly according to any clause herein, wherein the tubular resilient member includes a distal end portion which extends about the elongate protrusion, the distal end portion of the tubular resilient member having a reduced wall thickness.

(125) A valve assembly according to any clause herein, including a nozzle comprising said elongate protrusion and said end member and/or including a valve comprising said tubular resilient member.

(126) A valve assembly according to any clause herein, wherein the tubular resilient member couples to the end member via male and female members.

(127) A valve assembly according to any clause herein, wherein the tubular resilient member includes a radially-extending portion which extends about and abuts the end member and includes an axially-extending distal portion which extends about the elongate protrusion.

(128) A valve assembly according to any clause herein, wherein the tubular resilient member includes an intermediate portion which couples together the radially-extending portion and the axially-extending distal portion thereof, the intermediate portion of the tubular resilient member tapering in a direction extending from the radially-extending portion of the tubular resilient member to the axially-extending portion of the tubular resilient member.

(129) A valve assembly according to any clause herein, wherein the tubular resilient member is corrugated and/or folded at least in part in a non-actuated state and unfolded and/or less folded in an actuated state in which foodstuff is enabled to pass therethrough.

(130) A valve assembly according to any clause herein, wherein the tubular resilient member includes a plurality of annular folds which extend one or more of: radially-inwards and axially-outwards.

(131) A valve assembly according to any clause herein, wherein the tubular resilient member includes a distal end portion and one or more recessed regions which facilitate movement of the distal end portion axially and radially outwards to enable foodstuff to pass therethrough.

(132) A valve assembly according to any clause herein, wherein the one or more recessed regions are one or more of: annular; triangular shaped in lateral section; axially outwardly facing; and aligned in part with respective ones of the one or more apertures.

(133) A valve assembly for dispensing foodstuff, the valve assembly comprising: an inner valve member includes a radially outwardly-extending flange with one or more circumferentially spaced-apart apertures extending therethrough and an elongate protrusion coupled to and extending axially outwards from the flange, with the one or more apertures being adjacent to and extending about an exterior of the elongate protrusion; and an outer valve member which is more resilient than the inner valve member, the outer valve member including a radially outwardly-extending flange shaped to couple with the flange of the inner valve member, the outer valve member including a tubular portion which is cylindrical in outer shape and which extends about the elongate protrusion, and the outer valve member including a tapered sleeve which extends and tapers from the flange to the tubular portion.

(134) A valve assembly according to any clause herein, wherein one or more of: the sleeve aligns with and covers the one or more apertures; an annular space is formed between the sleeve and the one or more apertures; the annular space tapers in a direction extending from the one or more apertures to the sleeve; and the annular space is triangular in lateral section.

(135) A valve assembly according to any clause herein, wherein the sleeve is configured to facilitate movement of the tubular portion of the outer valve member axially and radially outwards from the protrusion of the inner valve member when the valve is actuated.

(136) A valve assembly for dispensing foodstuff, the valve assembly comprising: an elongate conduit having a closed end and one or more radially-extending apertures extending therethrough; a tubular resilient member extending about the conduit; and one or more ledges coupled to and extending radially outwards from the conduit.

(137) A valve assembly according to any clause herein, wherein the one or more ledges are shaped to one or more of: inhibit axial movement of the outer valve member relative to the inner valve member until pressure acting thereon exceeds a predetermined threshold; and selectively enable movement of the outer valve member axially and/or radially relative to the inner valve member while inhibiting rotation the outer valve member relative to the inner valve member.

(138) A dispenser apparatus comprising a valve assembly according to any clause herein.

(139) A dispenser apparatus comprising a valve means for selectively enabling foodstuff to exit therefrom.

(140) A valve according to any clause herein.

(141) A dispenser lid comprising a valve assembly of any clause herein.

(142) A dispenser lid according to any clause herein, including one or more base members of any clause herein.

(143) A valve assembly for dispensing foodstuff, the valve assembly comprising: an elongate conduit having a closed end, an outer surface and one or more radially-extending apertures extending therethrough; and a tubular resilient member shaped to extend about and parallel to the outer surface of the conduit, wherein the extent to which the resilient member aligns with or extends axially outwards from the elongate conduit is a function of the viscosity of the foodstuff.

(144) A valve assembly for dispensing foodstuff, the valve assembly comprising: an elongate conduit having a closed end, an outer surface and one or more radially-extending apertures extending therethrough; and a tubular resilient member shaped to extend about and parallel to the outer surface of the conduit, wherein the resilient member is configured such that a distal end thereof aligns near or adjacent the closed end of the elongate conduit for less viscous foodstuff and is spaced axially outwards from the closed end of the elongate conduit for more viscous foodstuff.

(145) A method of configuring a valve assembly for dispensing foodstuff, the method comprising: providing an elongate conduit having a closed end, an outer surface and one or more radially-extending apertures extending therethrough; and providing a tubular resilient member shaped to extend about and parallel to the outer surface of the conduit, including configuring the extent to which a distal end of the resilient member aligns with or space axially outwards from the closed end of the elongate conduit based on a viscosity of the foodstuff.

(146) A method of configuring a valve assembly for dispensing foodstuff according to any clause herein, the method including: determining a viscosity of the foodstuff to be used with the valve assembly; and within the configuring step, configuring the extent to which the distal end of the resilient member aligns with or space axially outwards from the closed end of the elongate conduit based on said viscosity so determined.

(147) Apparatus including any new and inventive feature, combination of features, or sub-combination of features as described herein.

(148) Methods including any new and inventive steps, acts, combination of steps and/or acts or sub-combination of steps and/or acts as described herein.

The following is offered as yet additional description. The concept uses a dispensing dispenser lid and valve along with a vented dispenser lid (for squeeze bottle applications).

a. The dispensing dispenser lid has one or more protrusions or a nozzle extending from the non-sauce side of the dispenser lid. The shape/diameter/length of the nozzle and valve may be determined by the type of sauce, valve functionality and cleanability.

b. Each dispenser lid protrusion has one or more apertures extending therethrough and around the circumference thereof. The apertures extend through the protrusion wall, thereby allowing a means of egress. The diameter, angle and circumferential placement of the apertures may be determined by the type of sauce, valve functionality and cleanability.

c. The valve is located/seated on the exterior of the dispensing dispenser lid or nozzle. The valve including matching protrusion(s) and is fit over the dispenser lid or nozzle. This may occur via an interference to close fit between the valve and dispenser lid protrusion(s) or nozzle. The bottom of the valve protrusion is left open in part so that sauce can be selectively dispensed therefrom.

d. In use, the dispenser (e.g. squeeze bottle) is actuated (e.g. by squeezing the bottle), which builds up pressure therewithin so as to overcome the reaction forces of the valve and cause foodstuff (e.g. sauce) to flow towards the dispensing dispenser lid or nozzle. The foodstuff is extruded radially outwards for dispenser apparatus 30 or axially outwards for dispenser apparatuses 30.1/ 30.2/30.3, the sauce then hits elastomer valve 108A/ 108A.1/108A.2/108A.3 thereby expanding it (which also reduces the pressure). The foodstuff or sauce takes the path of least resistance and is redirected by valve axially downwards. Once the actuation stops valve 108A/108A.1/108A.2/108A.3 contracts expelling the trapped foodstuff or sauce and then stops any further flow of the foodstuff or cause. If dispenser apparatus 30/30.1/30.2/30.3 is in the form of a squeeze bottle, then a secondary valve or vent is provided to allow make up air into the bottle and return to the bottle to its non-squeezed or round state.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A valve assembly for dispensing foodstuff, the valve assembly comprising:

a rigid valve member having one or more apertures extending therethrough and including an elongate conduit; and a resilient valve member including a first tubular portion which extends axially about the elongate conduit of the rigid valve member, a flange portion which extends radially outwards, a second tubular portion which operatively couples together the first tubular portion and flange portion thereof, with the second tubular portion of the resilient valve member tapering in a direction extending from the flange portion to the first tubular portion thereof, and a sealing ring coupled to and extending radially inwards from one of the tubular portions thereof so as to abut the elongate conduit of the rigid valve member, wherein the second tubular portion of the resilient valve member is radially outwardly spaced from the elongate conduit of the rigid valve member so as to define a first annular space therebetween and through which foodstuff selectively passes, wherein the first tubular portion of the resilient valve member is radially outwardly spaced from the elongate conduit of the rigid valve member so as to define a second annular space therebetween and through which foodstuff selectively passes, and wherein the sealing ring of the resilient valve member is interposed between the first annular space and the second annular space and functions to inhibit foodstuff from passing therethrough until the valve assembly is actuated.

2. A valve assembly according to claim 1, wherein foodstuff passes through said one or more apertures in order to exit from the valve assembly.

3. A valve assembly according to claim 1, wherein the second tubular portion of the resilient valve member is configured to be less slanted when the valve assembly is actuated.

4. A valve assembly according to claim 1, wherein actuation thereof causes both the first and second annular spaces to be in fluid communication with the one or more apertures of the rigid valve member.

5. A valve assembly according to claim 1, wherein actuation thereof causes the second tubular portion of the resilient valve member to extend axially and radially outwards.

6. A valve assembly according to claim 1, wherein the first tubular portion of the resilient valve member has a substantially constant diameter at least when the valve assembly is a non-actuated state.

7. A valve assembly according to claim 1, wherein the elongate conduit of the rigid valve member has a substantially constant inner diameter extending from a distal end towards a proximal end thereof.

8. A valve assembly according to claim 1, wherein the first tubular portion of the resilient valve member extends substantially vertically at least when the valve assembly is in a non-actuated state.

9. A valve assembly according to claim 1, wherein the first tubular portion of the resilient valve member has a distal end and wherein the elongate conduit of the rigid valve member has a distal end which extends axially outwards from the distal end of the first tubular portion of the resilient valve member at least when the valve assembly is in a non-actuated state.

10. A valve assembly according to claim 1, wherein actuation of the valve assembly causes the first tubular portion of the resilient valve member to extend radially outwards from the elongate conduit of the rigid valve member.

11. A valve assembly according to claim 1, wherein the valve assembly is configured such that a required actuation pressure thereof to enable foodstuff to pass therethrough, is substantially determined by the shape of the sealing ring of the resilient valve member and the extent to which the sealing ring of the resilient valve member interfere fits about the elongate conduit of the rigid valve member.

12. A valve assembly according to claim 1, wherein the elongate conduit of the rigid valve member has an outer diameter, and wherein the sealing ring of the resilient valve member when unassembled has an inner diameter which is 8 to 20% smaller than the outer diameter of the elongate conduit of the rigid valve member.

13. A valve assembly according to claim 1, wherein actuation thereof causes the sealing ring of the resilient valve member to expand radially outwards from the elongate conduit of the rigid valve member so as to selectively enable foodstuff to pass therethrough.

14. A valve assembly according to claim 1, wherein the elongate conduit of the rigid valve member has a distal end which is open and a proximal end which is closed, and wherein the elongate conduit of the rigid valve member has an inner diameter which is substantially constant from the distal end towards to the proximal end thereof.

15. A valve assembly according to claim 1, wherein the second tubular portion of the resilient valve member has an inwardly-facing surface which acts to change a head pressure on the sealing ring of the resilient valve member and promote holding in place of the resilient valve member.

16. A valve assembly according to claim 1, wherein the inwardly-facing surface of the second tubular portion of the resilient member functions to reduce the head pressure on the sealing ring of the resilient valve member when the valve assembly is in a non-actuated state and wherein the inwardly-facing surface of the second tubular portion of the resilient member functions to increase the head pressure on the sealing ring of the resilient valve member when the valve assembly is actuated.

17. A valve assembly according to claim 1, wherein actuation of the valve assembly causes the first and second annular spaces to enlarge radially outwards.

18. A valve assembly according to claim 1, wherein the sealing ring of the resilient valve member is positioned between a proximal end and a distal end of the elongate conduit of the rigid valve member.

19. A valve assembly according to claim 1, wherein the sealing ring of the resilient valve member extends generally perpendicular to the first tubular portion of the resilient valve member at least in a non-actuated state.

20. A dispenser apparatus comprising:

an enclosure;

a dispenser lid threadably coupled to the enclosure, wherein the dispenser lid is shaped to be removable from the enclosure and promote cleanability thereof; and the valve assembly of claim 1, the valve assembly operatively connecting to the dispenser lid, wherein the resilient valve member of the valve assembly is shaped to be removable from the dispenser lid and promote cleanability thereof.

* * * * *